(12) United States Patent
DiCarlo et al.

(10) Patent No.: US 11,312,213 B2
(45) Date of Patent: Apr. 26, 2022

(54) SYSTEMS AND METHODS FOR DETECTING VEHICLE DOOR CLOSING EVENTS

(71) Applicant: Lyft, Inc., San Francisco, CA (US)

(72) Inventors: Michael Jonathan DiCarlo, El Dorado Hills, CA (US); Romain Clement, Campbell, CA (US); Mikael Kjell Anders Thor, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 101 days.

(21) Appl. No.: 16/712,612

(22) Filed: Dec. 12, 2019

(65) Prior Publication Data

US 2020/0406727 A1     Dec. 31, 2020

Related U.S. Application Data

(63) Continuation of application No. 16/453,852, filed on Jun. 26, 2019, now Pat. No. 10,538,149.

(51) Int. Cl.
*B60J 5/04* (2006.01)
*E05C 19/00* (2006.01)
*E05F 15/42* (2015.01)
*E05B 17/20* (2006.01)

(52) U.S. Cl.
CPC ............. *B60J 5/047* (2013.01); *E05C 19/005* (2013.01); *E05F 15/42* (2015.01); *E05B 17/2026* (2013.01); *E05F 2015/483* (2015.01)

(58) Field of Classification Search
CPC ..... B60J 5/047; E05F 15/42; E05F 2015/483; E05C 19/005; E05B 17/2026
See application file for complete search history.

(56) References Cited

U.S. PATENT DOCUMENTS

| | | | |
|---|---|---|---|
| 9,809,159 B1* | 11/2017 | Snyder | B60T 17/22 |
| 9,867,015 B1* | 1/2018 | Mukhtar | G01C 21/165 |
| 9,963,106 B1 | 5/2018 | Ricci | |
| 10,219,116 B2* | 2/2019 | Lundsgaard | G01S 19/14 |
| 10,555,133 B1* | 2/2020 | Cohen | H04W 4/40 |
| 2013/0332004 A1* | 12/2013 | Gompert | G07C 5/02 |
| | | | 701/1 |
| 2015/0120336 A1 | 4/2015 | Grokop et al. | |
| 2016/0189531 A1 | 6/2016 | Modi et al. | |
| 2017/0069144 A1 | 3/2017 | Lawrie-Fussey et al. | |
| 2017/0279957 A1 | 9/2017 | Abramson et al. | |
| 2018/0162272 A1 | 6/2018 | Newton et al. | |
| 2018/0213360 A1* | 7/2018 | Schmitt | G01C 21/18 |
| 2019/0279440 A1 | 9/2019 | Ricci | |
| 2020/0019926 A1* | 1/2020 | Ayoub | G06Q 10/0833 |
| 2020/0070777 A1* | 3/2020 | Chen | G06F 3/017 |

OTHER PUBLICATIONS

Notice of Allowance received for U.S. Appl. No. 16/453,852 dated Oct. 2, 2019, 21 pages.

* cited by examiner

*Primary Examiner* — Raymond L Nimox
(74) *Attorney, Agent, or Firm* — Keller Preece PLLC

(57) ABSTRACT

The disclosed computer-implemented method may include receiving sensor data associated with a mobile device associated with a vehicle, wherein the sensor data includes at least one of an angular velocity vector, a linear acceleration vector, and a rotational acceleration vector recorded over a period of time, determining an event signature based on the sensor data, and detecting a door closing event associated with the vehicle based at least in part on the event signature. Other methods, systems, and computer-readable media are disclosed.

20 Claims, 12 Drawing Sheets

SYSTEMS AND METHODS FOR DETECTING VEHICLE DOOR CLOSING EVENTS

CROSS REFERENCE TO RELATED APPLICATION

This application claims the benefit of U.S. application Ser. No. 16/453,852, filed 26 Jun. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
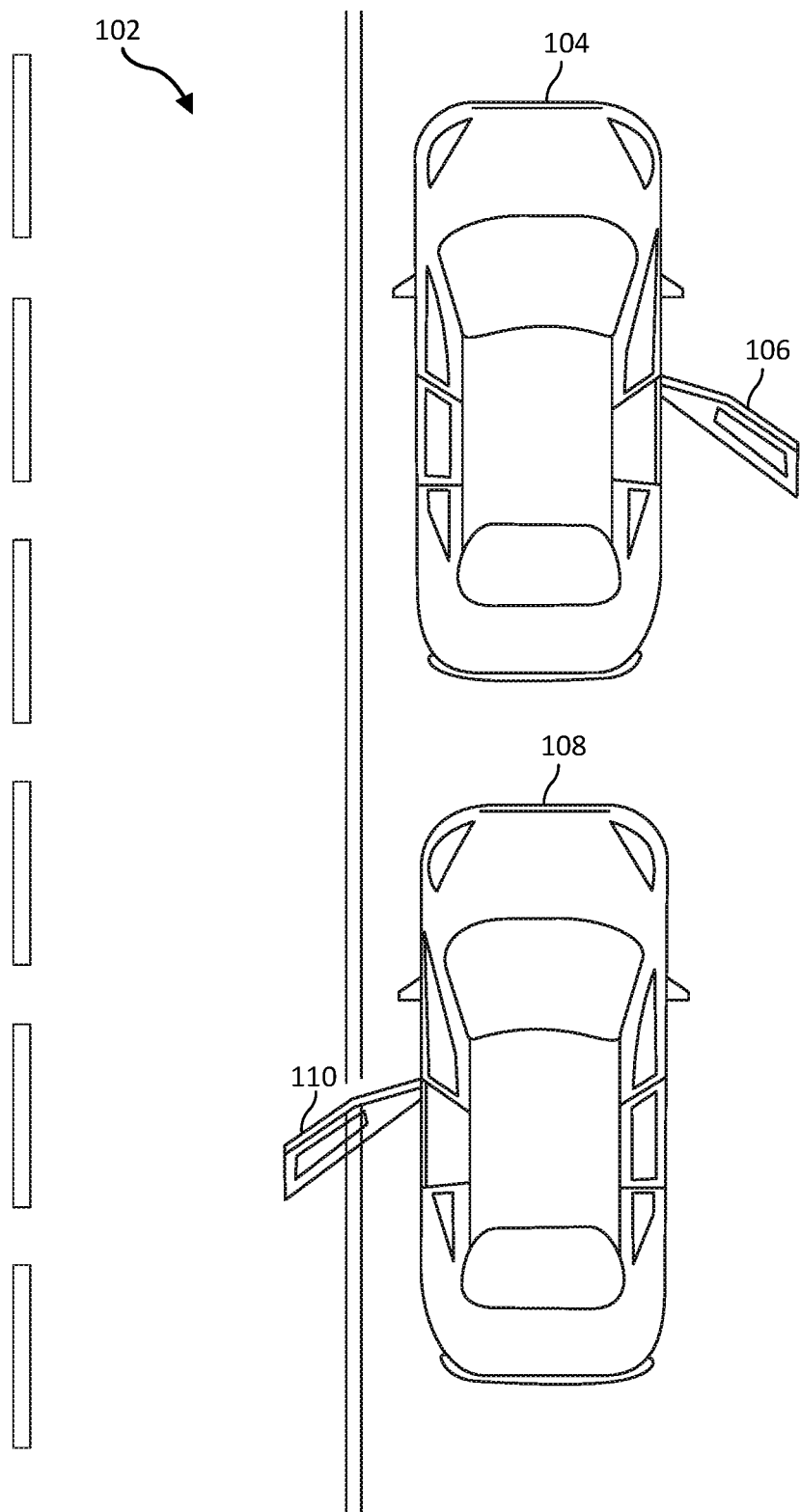
FIG. 1 is an illustration of door closing events occurring on stationary vehicles.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to detecting vehicle door closing events. A dynamic transportation system that matches transportation requestors with transportation providers for transportation services may benefit from detecting door closing events on a transportation provider vehicle.

Detecting a vehicle door closing event may be accomplished using any suitable method. An example method may include receiving sensor data, processing the sensor data, and determining that the sensor data corresponds to a door closing event. The sensor data may be received from an inertial measurement unit (e.g., a gyroscope, an accelerometer) that measures speed and acceleration in multiple linear and rotational directions. A processor may process the data using any suitable method. For example, a processor may use a Fast Fourier Transform algorithm, time domain digital signal processing, linearization, filtering, a finite impulse response algorithm, etc. to process the sensor data. The sensor data processing may produce a signature associated with the door closing event. The processor may detect a door closing event associated with the vehicle based on the event signature.

Additionally or alternatively, sensors other than inertial sensors may be used to determine the door closing event signature. For example, a computing device in the vehicle may include a barometric pressure sensor that measures a relative change in air pressure within the cabin of the vehicle caused by the closing of a door. As another example, a computing device in the vehicle may include a microphone that senses sound waves in the cabin of the vehicle. A door closing on a vehicle may cause an impact sound wave that may be detected by the signature of the sound wave. The signature of the sound wave may be limited to the frequency information associated with the sound wave. No actual content of the sound is required to detect the signature of the sound wave. Other methods of detecting door closing events may include image processing, radar ranging, laser ranging, radio frequency identification, or a combination thereof.

Although the systems and methods described herein may detect a door closing event, the present disclosure is not limited to such. The systems and methods described herein may also be used to detect impacts to a vehicle (e.g., impacts from external objects, vehicle collisions, etc.). The systems and methods may also include acquiring data associated with a door closing event, such as the location of the vehicle at the time of the door closing, the time of day of the door closing, the number of passengers entering the vehicle through the door, etc.

As will be explained in greater detail below, detecting door closing events on transportation provider vehicles using the systems methods disclosed herein may provide benefits to the operation of a transportation management system. Accordingly, as may be appreciated, the systems and methods described herein may improve the functioning of a computer that implements transportation matching. For example, these systems and methods may improve the functioning of the computer by improving transportation routing decisions. Additionally or alternatively, these systems and methods may improve the functioning of the computer by reducing the computing resources consumed to detect vehicle door closing events (and, e.g., thereby freeing computing resources for other tasks, such as those directly and/or indirectly involved in transportation matching).

The following will provide, with reference to FIG. 1, detailed descriptions of door closing events occurring on stationary vehicles. Descriptions of FIG. 2 will provide details of a computing device for detecting door closing events mounted on the dashboard of a vehicle. Descriptions of FIGS. 3 and 4 will provide details of sensors, processors, and modules for detecting vehicle door closing events based on event signatures. Descriptions of FIGS. 5, 6, and 7 will provide details of methods of processing gyroscope and accelerometer data to determine event signatures of vehicle door closing events. Descriptions of FIG. 8 will provide details of a method for detecting vehicle door closing events.

Figure 9:
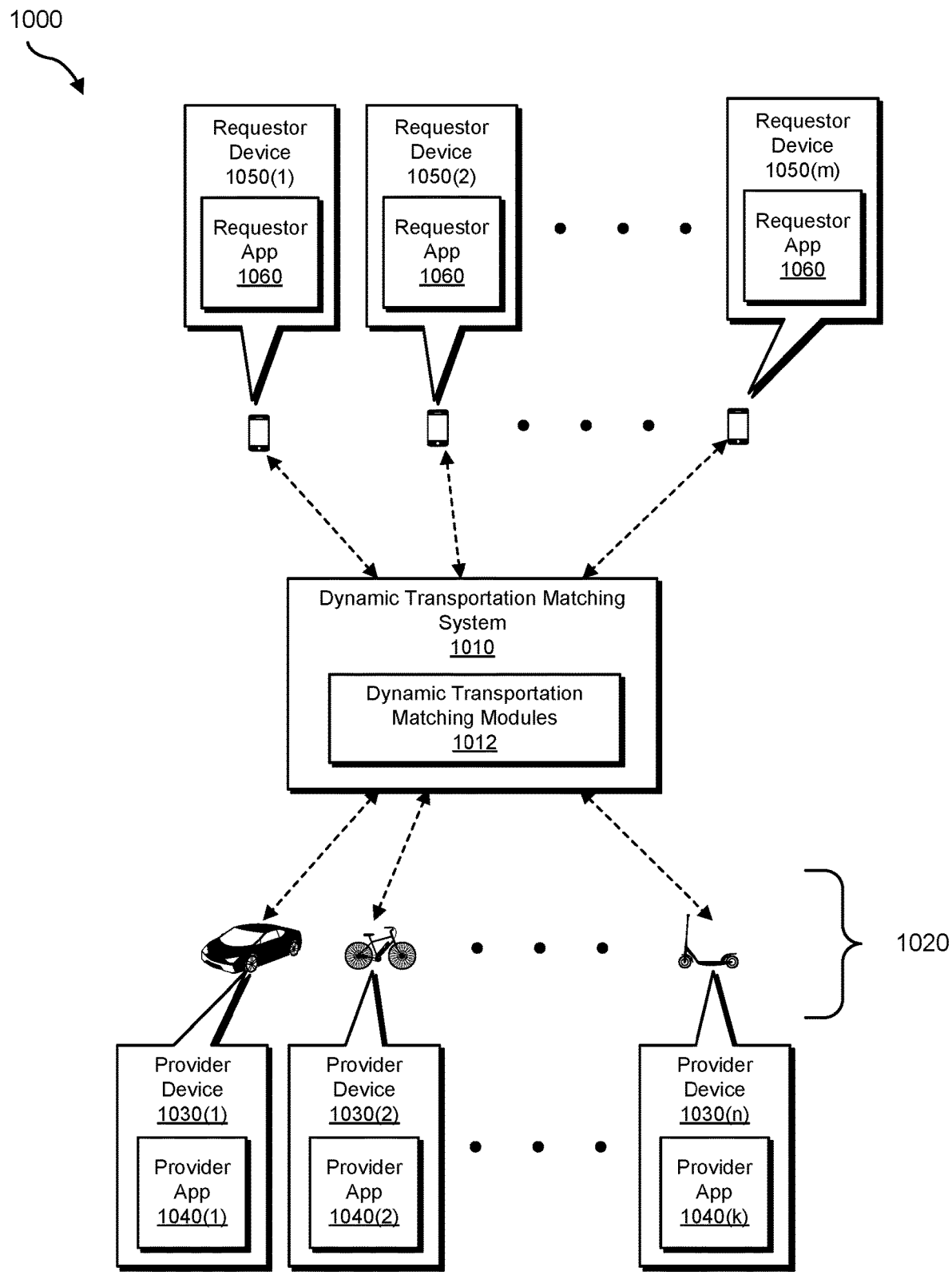
FIG. 9 illustrates an example system for matching transportation requests with a dynamic transportation network that includes personal mobility vehicles.
Figure 10:
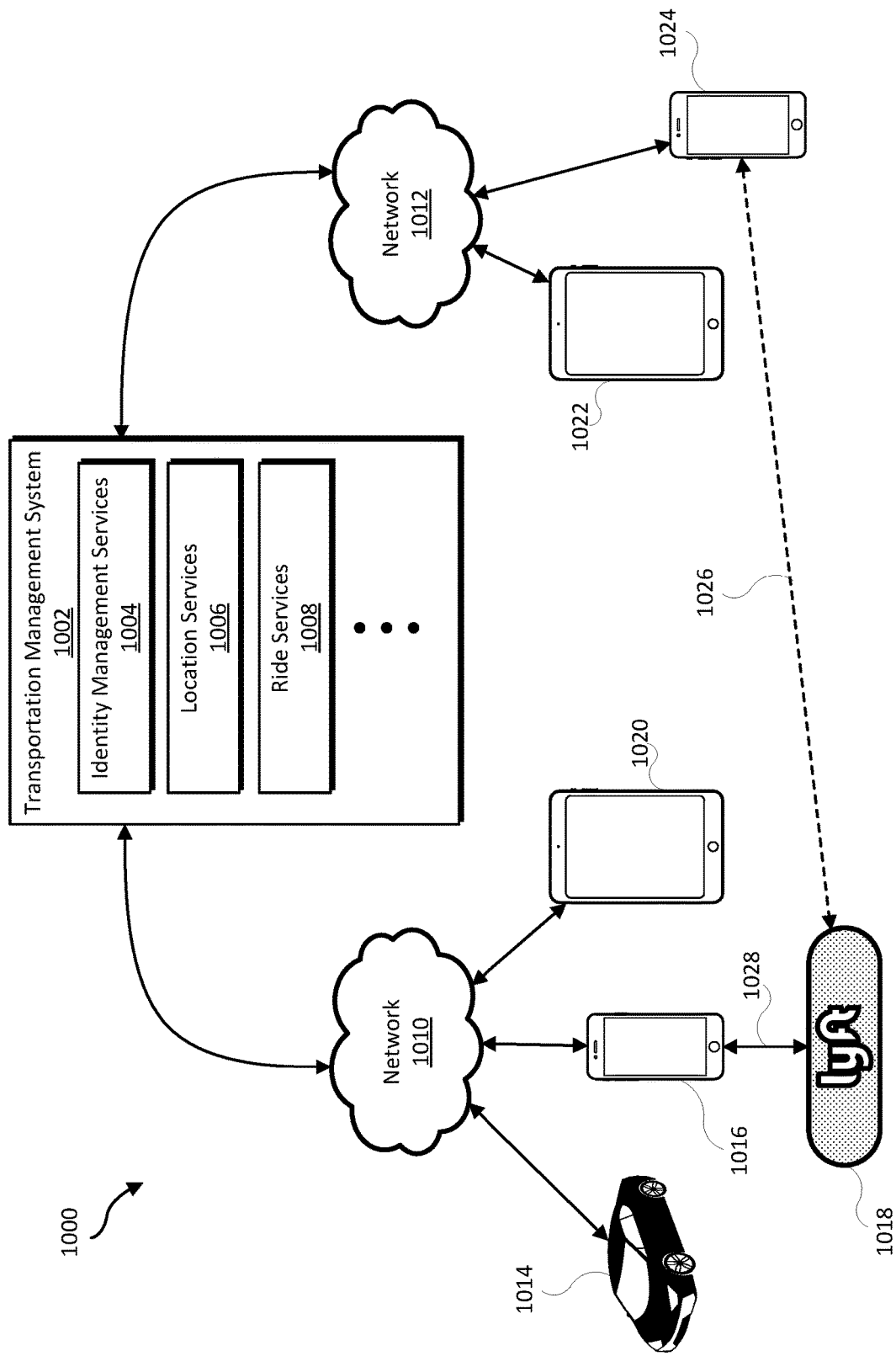
FIG. 10 is an illustration of an example transportation requestor/transportation provider management environment.
Figure 11:
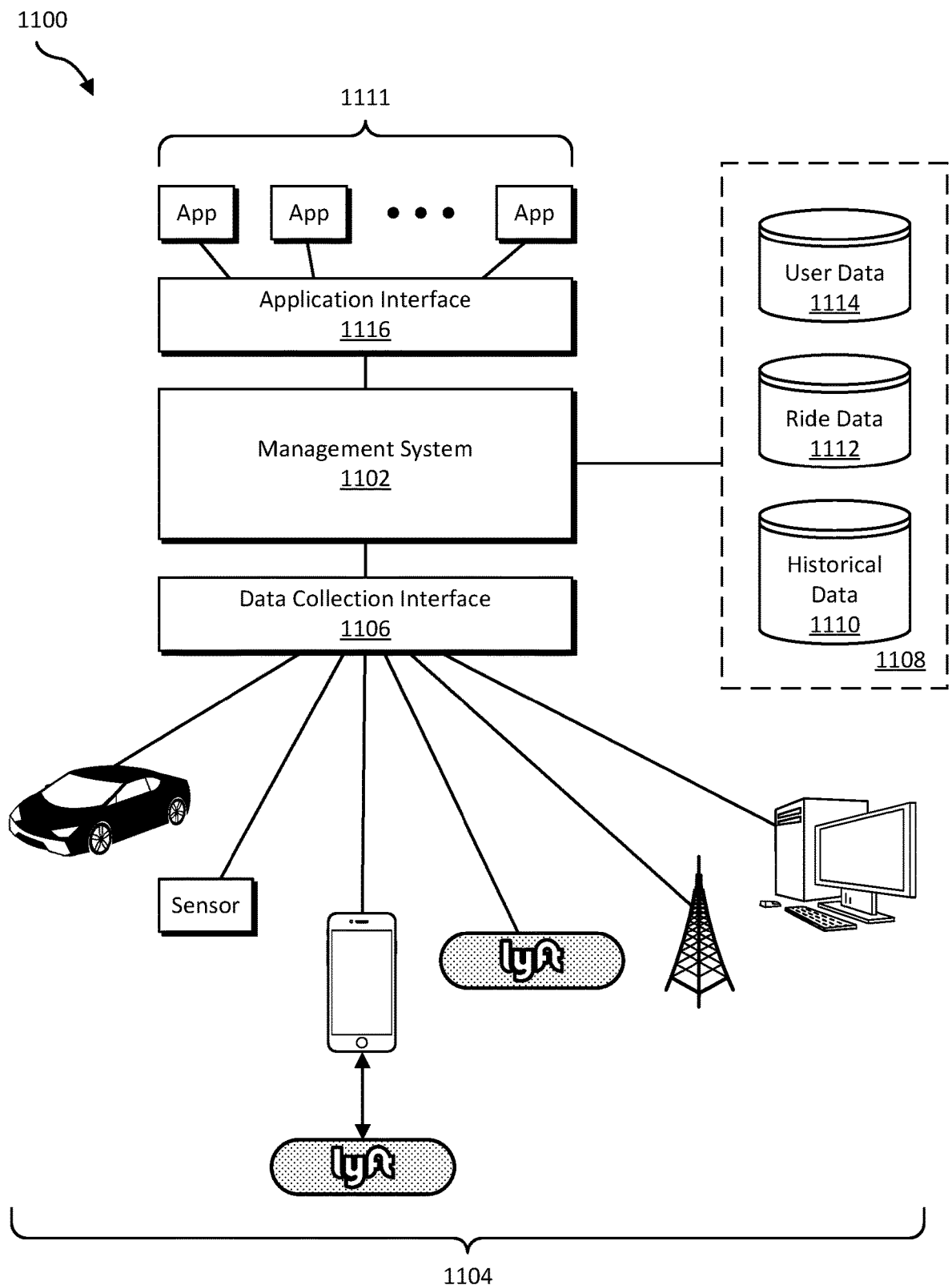
FIG. 11 is an illustration of an example data collection and application management system.

Descriptions of FIGS. 9-11 will provide details of an example transportation requestor/transportation provider management environment.

FIG. 1 is an illustration of door closing events occurring on stationary vehicles. In some examples, a dynamic transportation system may benefit from knowledge associated with door closing events on a vehicle that provides transportation services. For example, the dynamic transportation system may need to know which door(s) of the vehicle have closed, the location of the vehicle at the time of a door closing, the time of day of the door closing, a number of passengers entering the vehicle through the door, etc. Vehicle 104 may be a transportation provider vehicle operating in a dynamic transportation system. Vehicle 104 may provide transportation services and be stationary on the right side of road 102 during the process of picking up a transportation requestor or dropping off a transportation requestor. The transportation requestor may close right door 106 after entering or exiting the vehicle. A dynamic transportation system may benefit from knowledge of a right door 106 closing event in order to determine transportation provider routing decisions. Vehicle 108 may also provide transportation services and be stationary on the right side of road 102 during the process of picking up a transportation requestor or dropping off a transportation requestor. The transportation requestor may close left door 110 after entering or exiting the vehicle. A dynamic transportation system may benefit from knowledge of the left door 110 closing event in order to determine transportation provider routing decisions.

Figure 2:
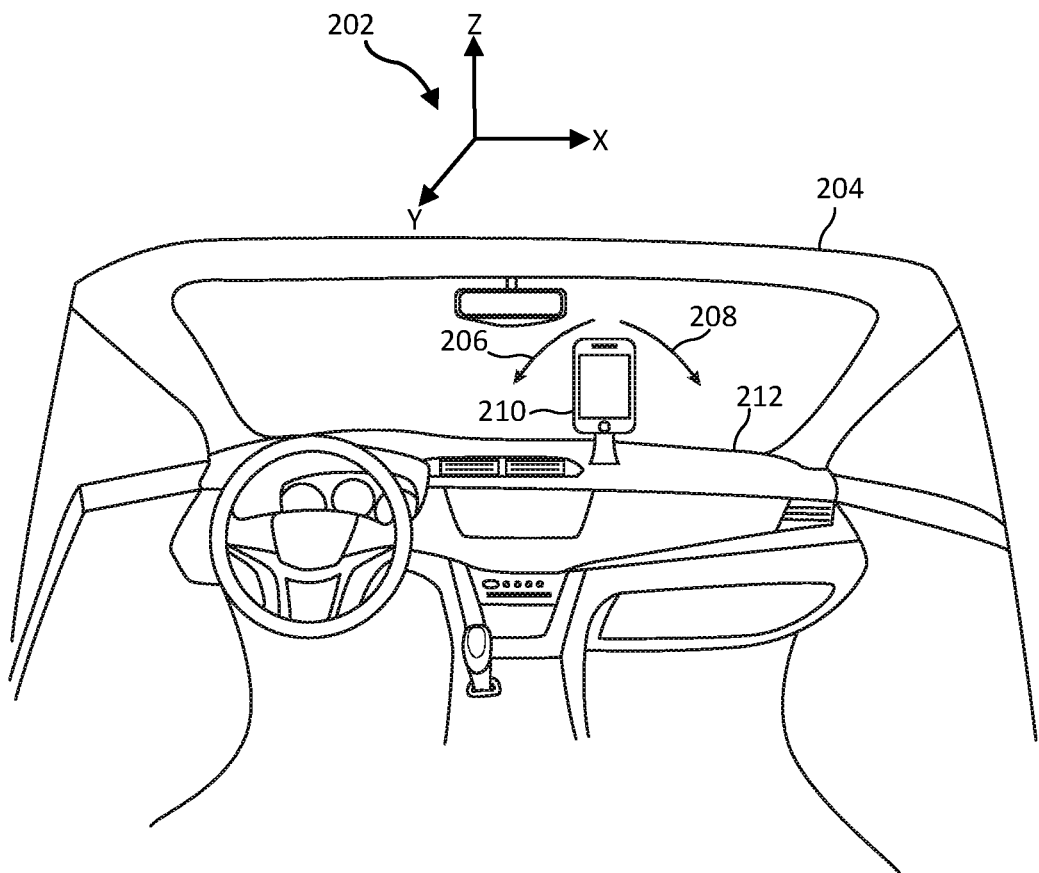
FIG. 2 is an illustration of a computing device mounted on the dashboard of a vehicle.

FIG. 2 is an illustration a computing device mounted on the dashboard of a vehicle. In some examples, the computing device may be a computing device of the transportation provider (e.g., smartphone) and the vehicle may be a transportation provider vehicle that provides transportation services. FIG. 2 shows the interior dashboard area of vehicle 204 with computing device 210 securely mounted on dashboard 212. Computing device 210 may include a processor (e.g., processor 320 of FIG. 3) and a gyroscope sensor. The processor may receive sensor data from the gyroscope. The gyroscope may measure angular velocity and acceleration in directions multiple (e.g., 3 dimensional). For example, the gyroscope may measure the pitch, roll, and yaw of computing device 210 corresponding to axes X, Y, and Z, respectively, of coordinates 202. When computing device 210 is securely mounted to dashboard 212 within vehicle 204, the gyroscope may subject to vehicle movements and may therefore measure the pitch, roll, and yaw of vehicle 204. In some examples, a door closing on vehicle 204 may cause an impact acceleration to the vehicle. When a right door is closed, an impulse momentum may be imparted on vehicle 204 in rotational direction 210. When a left door is closed, an impulse momentum may be imparted on vehicle 204 in rotational direction 208. The impulse momentum imparted on the vehicle may be transmitted to computing device 210 securely mounted on dashboard 212. The gyroscope may measure the impulse momentum caused by force transferred from the door closing event and produce sensor data associated with the impulse. As will be described in detail with respect to FIGS. 5 and 6, sensor data from the gyroscope may indicate a change in the pitch, roll, and yaw of the vehicle caused by the closing door. In some examples, the roll axis (e.g., Y axis) of the vehicle may experience the highest change in rotational velocity as compared to the pitch axis (e.g., X axis) and the yaw axis (e.g., Z axis). The processor may determine an event signature from the gyroscope sensor data and detect that the event signature indicates a door closing event has occurred.

Figure 3:
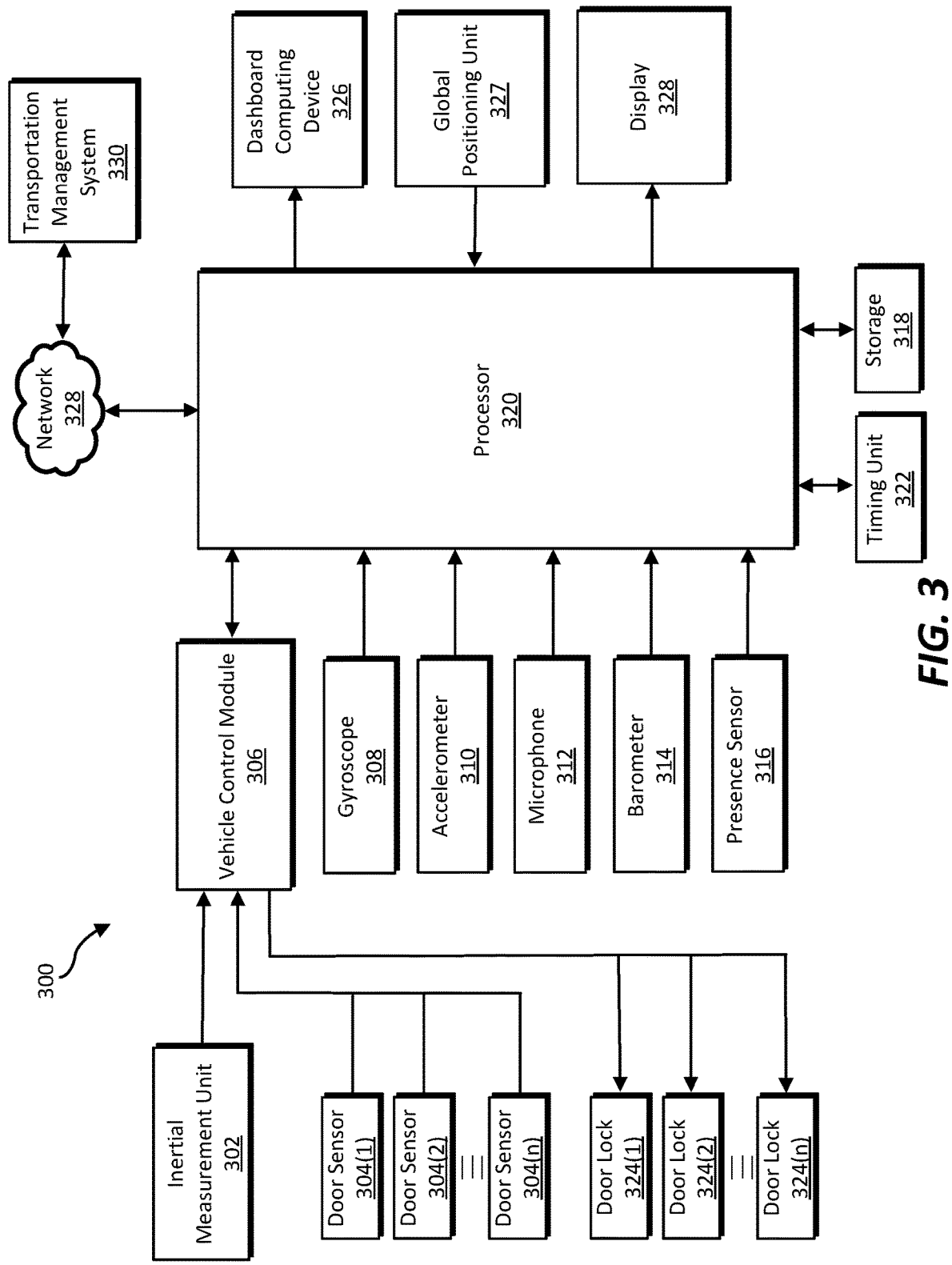
FIG. 3 is a block diagram of an example system for detecting vehicle door closing events.

FIG. 3 is a block diagram of an example system for detecting vehicle door closing events. As shown in FIG. 3, system 300 is an example system for detecting vehicle door closing events. Vehicle door closing events may be detected using any suitable method and system. System 300 may include processor 320 that may receive sensor data from multiple sensors and data sources. Processor 320 may execute instructions stored in storage 318 that processes the sensor data and detects vehicle door closing events. Processor 320 may be included in a computing device of a transportation provider that operates the vehicle. In some examples, processor 320 may be included in a computing module of the vehicle. Processor 320 may receive sensor data from gyroscope 308. Gyroscope 308 may also be included in the computing device of the transportation provider operating the vehicle. Gyroscope 308 may measure angular velocity and acceleration in multiple directions (e.g., 3 dimensional). For example, gyroscope 308 may measure the pitch, roll, and yaw of the computing device that includes gyroscope 308. When a computing device that includes gyroscope 308 is securely mounted within a vehicle, for example, as described in FIG. 2, gyroscope 308 may subject to the vehicle movements and may therefore measure the pitch, roll, and yaw of the vehicle in which it is mounted. In some examples, a door closing on a vehicle may cause an impact acceleration to the vehicle. A closing door may have a momentum equal to the mass of the door times the door velocity as it is closing. When the door is closed, and the velocity goes to zero, an impulse momentum may be imparted on the vehicle. The impulse momentum imparted on the vehicle may be transmitted through the vehicle to the computing device securely mounted in the vehicle. Gyroscope 308 may measure the impulse momentum transmitted to the computing device and output sensor data associated with the impulse. As will be described in detail with respect to FIGS. 5 and 6, the sensor data from gyroscope 308 may indicate a change in the pitch, roll, and yaw of the vehicle. In some examples, the roll axis (e.g., longitudinal axis) of the vehicle may experience the highest change in acceleration as compared to the pitch axis (e.g., transverse axis) and the yaw axis (e.g., vertical axis). Processor 320 may process the sensor data from gyroscope 308 and determine that the sensor data indicates that a door closing event has occurred. Processor 320 may determine the amplitude and frequency components of the sensor data from gyroscope 308 using processing techniques including, without limitation, Fast Fourier Transform, time domain digital signal processing, linearization, filtering, finite impulse response, or a combination thereof. In some examples, processor 320 may compare the amplitude and frequency components (e.g., a signature pattern) of the sensor data from gyroscope 308 to known gyroscope signature patterns of door closing events to determine if a door closing event has occurred.

Processor 320 may receive sensor data from accelerometer 310. Accelerometer 310 may also be included in the computing device of the transportation provider operating the vehicle. Accelerometer 310 may measure linear acceleration in multiple directions (e.g., 3 dimensional). For example, accelerometer 310 may measure linear acceleration in the longitudinal, transverse, and vertical axis of the vehicle when the computing device is securely attached to the vehicle. Similar to gyroscope 308, accelerometer 310 may be subject to the vehicle movements and may therefore measure linear acceleration of the vehicle in any direction. In some examples, a door closing on a vehicle may cause an impact acceleration to the vehicle. When the door is closed, and the velocity goes to zero, an impulse momentum may be imparted on the vehicle. The impulse momentum imparted on the vehicle may be transmitted to a computing device securely mounted in the vehicle. Accelerometer 310 may measure the impulse momentum transmitted to the computing device and output sensor data associated with the impulse. The sensor data from accelerometer 310 may indicate a change in the linear acceleration of the vehicle caused by the impulse of the closing door. Processor 320 may process the sensor data from accelerometer 310 and determine that the sensor data indicates that a door closing event has occurred. Processor 320 may determine the amplitude and frequency components of the sensor data from accelerometer 310 using processing techniques including, without limitation, Fast Fourier Transform, time domain digital signal processing, linearization, filtering, finite impulse response, or a combination thereof. In some examples, processor 320 may compare the amplitude and frequency components (e.g., a signature pattern) of the sensor data from accelerometer 310 to known accelerometer signature patterns of door closing events to determine if a door closing event has occurred.

Processor 320 may receive sensor data from microphone 312. Microphone 312 may also be included in the computing device of the transportation provider operating the vehicle. Microphone 312 may sense sound waves in proximity to the computing device. For example, microphone 312 may sense sound waves within the cabin of the vehicle. In some examples, a door closing on a vehicle may cause an impact sound wave. The impact sound wave caused by the closing door may be sensed and recorded by microphone 312. Processor 320 may process the recorded sound wave from microphone 312 and determine that the sound wave indicates that a door closing event has occurred. Processor 320 may determine the amplitude and frequency components of the recorded sound wave using processing techniques including, without limitation, Fast Fourier Transform, time domain digital signal processing, linearization, filtering, finite impulse response, or a combination thereof. In some examples, processor 320 may compare the amplitude and frequency components (e.g., a sound wave pattern) of the recorded sound wave to known sound wave patterns of door closing events to determine if a door closing event has occurred.

Processor 320 may receive sensor data from barometer 314. Barometer 314 may also be included in the computing device of the transportation provider operating the vehicle. Barometer 314 may sense ambient air pressure in proximity to the computing device. For example, barometer 314 may sense ambient air pressure within the cabin of the vehicle. In some examples, a door closing on a vehicle may cause a change (e.g., sudden increase) in the relative air pressure within the cabin of the vehicle. The change in relative air pressure within the cabin of the vehicle caused by the closing door may be sensed and recorded by barometer 314. Processor 320 may receive and process sensor data including the change in relative air pressure from barometer 314 and determine that the change in relative air pressure indicates that a door closing event has occurred. Processor 320 may determine the amplitude and frequency components of the recorded change in relative air pressure using processing techniques including, without limitation, Fast Fourier Transform, time domain digital signal processing, linearization, filtering, finite impulse response, or a combination thereof. In some examples, processor 320 may compare the amplitude and frequency components (e.g., air pressure wave pattern) of the recorded air pressure to known air pressure wave patterns of door closing events to determine if a door closing event has occurred.

Processor 320 may receive sensor data from presence sensor 316. Presence sensor 316 may also be included in the computing device of the transportation provider operating the vehicle. When the computing device is mounted in the vehicle, presence sensor 316 may sense the presence, absence, status, and/or position of objects within the vehicle. Presence sensor 316 may use sensing technologies including, without limitation, image processing, radar ranging, laser ranging, radio frequency identification, or a combination thereof. Processor 320 may receive and process sensor data from presence sensor 316 and determine that the sensor data indicates that a door closing event has occurred. In some examples, processor 320 may process sensor data from presence sensor 316 and determine, without limitation, a number of transportation requestors within the vehicle, an activity of a transportation requestor, a presence, absence or position of a transportation provider, an activity of a transportation provider, a door position, a window position, a seat position, or a combination thereof.

In some examples, processor 320 may receive sensor data related to door closing events from sensors located outside of a computing device of the transportation provider. For example, processor 320 may receive sensor data from a computing device of a passenger or a transportation requestor. Sensor data from a computing device of a passenger or a transportation requestor may be transmitted to processor 320. Processor 320 may also receive sensor data from sensors within the vehicle. The vehicle may include inertial measurement unit 302 that may sense and record rotational velocity and linear acceleration similar to gyroscope 308 and accelerometer 310 described above. For example, inertial measurement unit 302 may measure the pitch, roll, and yaw of the vehicle. In some examples, a door closing on the vehicle may cause an impulse momentum to be imparted on the vehicle. The impulse momentum due to the door closing may be recorded by inertial measurement unit 302. Inertial measurement unit 302 may also include an accelerometer that measures acceleration in the longitudinal, transverse, and vertical axis of the vehicle. Similar to the gyroscope in inertial measurement unit 302, the accelerometer may sense linear acceleration of the vehicle caused by a door closing event. Sensor data from the gyroscope and/or accelerometer in inertial measurement unit 302 may be provided to vehicle control module 306. Vehicle control module 306 may pass the sensor data to processor 320 and/or vehicle control module 306 may preprocess (e.g., condition) the sensor data before passing the sensor data to processor 320. Processor 320 may process the sensor data from inertial measurement unit 302 and determine that the sensor data indicates that a door closing event has occurred. Processor 320 may determine the amplitude and frequency components of the sensor data from inertial measurement unit 302 using processing techniques including, without limitation, Fast Fourier Analysis, time domain digital signal processing, linearization, filtering, finite impulse response, or a combination thereof. In some examples, processor 320 may compare the amplitude and frequency components (e.g., a signature pattern) of the sensor data from inertial measurement unit 302 to known signature patterns of door closing events to determine if a door closing event has occurred.

In some examples, processor 320 may receive sensor data related to door closing events from door sensors located on the vehicle. For example, each door on the vehicle (e.g., front right door, front left door, rear right door, rear left door, rear door, hood, trunk, etc.) may have a sensor that indicates the open or closed status of the door. The vehicle may include door sensors 304(1) to 304(*n*). Door sensors 304(1) to 304(*n*) may each sense an individual door status on the vehicle. Each of door sensors 304(1) to 304(*n*) may send a door status to vehicle control module 306. Vehicle control module 306 may further send the door status to processor 320. Processor 320 may determine door closing events based on the status of door sensors 304(1) to 304(*n*). In one example, door sensor 304(1) may sense the door status of the right rear door of the vehicle and door sensor 304(2) may sense the door status of the left rear door of the vehicle. Processor 320 may determine that a transportation requestor has entered or exited the vehicle based on receiving a door open status from door sensor 304(1) or 304(2) and a period of time later receiving a door closed status from door sensor 304(1) or 304(2). Further, processor 320 may determine the number of transportation requestors that have entered or exited the vehicle based on the time period between the door open status and the door closed status. Processor 320 may receive timing information from timing unit 322. Timing unit 322 (e.g., crystal oscillator) may provide processor 320 with a timing base to determine the time period between the door open status and the door closed status. Further, timing unit 322 may provide processor 320 with a time of day and date. Processor 320 may create record of door opening and closing events and include the time of day and date associated with the door events. Processor 320 may receive location information associated with the door closing events from global positioning unit 327. Processor 320 may store the record of door closing events including the location, time of day, and date in storage 318. Further, the record of door closing events including the location, time of day, and date may be uploaded through network 328 to a server for access by transportation management system 330.

In some examples, processor 320 may control access to the vehicle. Processor 320 may control access to the vehicle by controlling the locking and unlocking of the vehicle doors (e.g., front right door, front left door, rear right door, rear left door, rear door, hood, trunk, etc.). Processor 320 may control the locking and unlocking of the vehicle doors by sending a control signal to vehicle control module 306. Vehicle control module 306 may send a signal (e.g., control message over a vehicle communications bus or a discrete signal) to door locks 324(1) to 324(*n*) to lock or unlock the doors. Processor 320 may lock or unlock vehicle doors in order to control which side of the vehicle a passenger (e.g., transportation requestor) is allowed access to. For example, a transportation provider may provide transportation services to a transportation requestor and stop the vehicle on the right side of a road to drop off the transportation requestor. The transportation provider may stop the vehicle alongside a curb or sidewalk of the right side of the vehicle. Processor 320 may lock a door on the left side of the vehicle and unlock a door on the right side of the vehicle, so the transportation requestor may exit the vehicle next to the curb or sidewalk.

In some examples, processor 320 may communicate with vehicle control module 306 to receive sensor data and control door locks over a vehicle interface bus. Processor 320 may communicate with vehicle control module 306 over a wired communications interface conforming to the On-Board Diagnostics (OBDII) standard. In some examples, processor 320 may communicate with vehicle control module 306 and/or other computing devices within the vehicle over a wireless communications interface (e.g., Bluetooth™, WiFi, cellular, etc.).

Although the above described embodiments disclose methods of detecting door closing events using individual types of sensors, the present disclosure is not limited to such and the methods include using a combination of sensor data from various types of sensors to detect door closing events. Embodiments of the present disclosure include detecting door closing events based on sensor data from, without limitation, a gyroscope, an accelerometer, a microphone, a barometer, a presence sensor, a vehicle IMU, a vehicle door sensor, or a combination thereof.

Additionally or alternatively, processor 320 may receive sensor data from any or all of the sensors described above and transmit the sensor data to transportation management system 330. Transportation management system 330 may be transportation management system 902 described in detail below with respect to FIG. 9. Transportation management system 330 may receive the sensor data transmitted from processor 320 through network 328. Network 328 may be network 910 or network 920 of FIG. 9. Transportation management system 330 may receive the sensor data and determine an event signature based on the sensor data. Further, transportation management system 330 may detect a door closing event associated with the vehicle based on the event signature. Transportation management system 330 may store a record of door closing events detected by processor 320 and a record of door closing events detected in other transportation provider vehicles.

In some examples, transportation management system 330 may determine vehicle routing decisions based on the record of door closing events and locations associated with the door closing events. Transportation management system 330 may transmit the vehicle routing decisions to processor 320 through network 328. The vehicle routing decisions may be provided to a transportation provider through display 328 and/or dashboard computing device 326.

Figure 4:
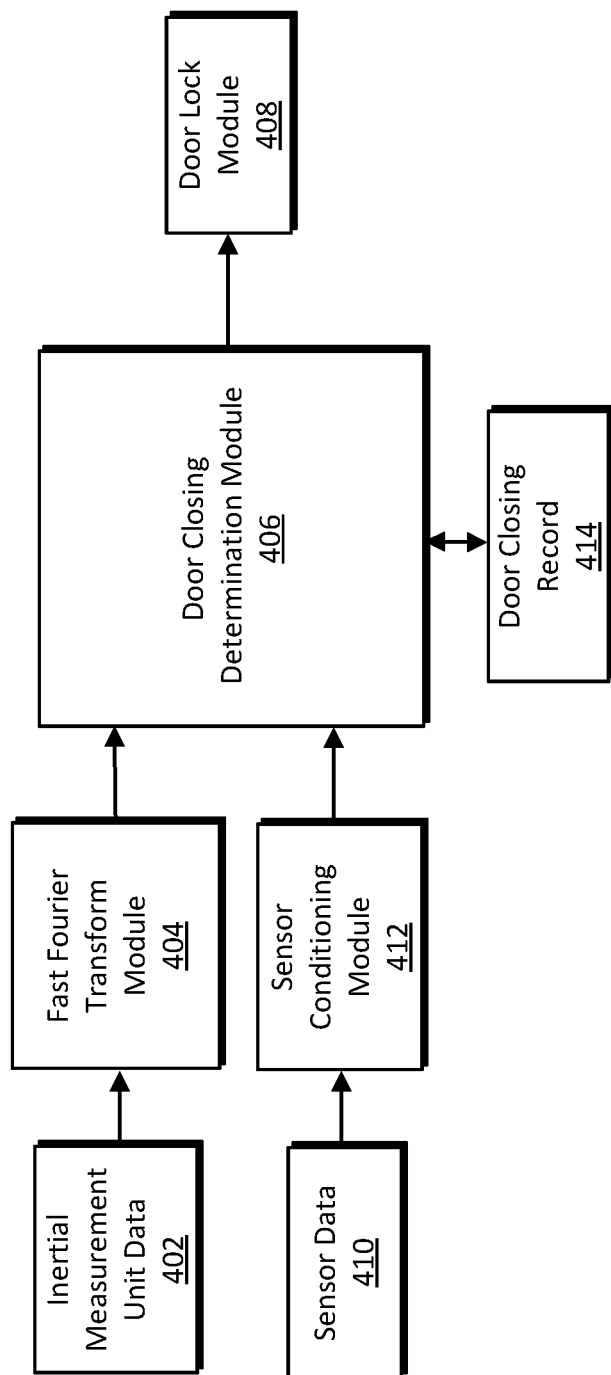
FIG. 4 is a block diagram of example modules for detecting vehicle door closing events.

FIG. 4 is a block diagram of example modules for detecting vehicle door closing events. The modules of FIG. 4 may receive sensor data from a transportation provider device mounted to a vehicle, determine an event signature based on the sensor data, and detect a door closing event associated with the vehicle based on the event signature. In some examples, door closing determination module 406 may receive sensor data inputs and detect a door closing event on a vehicle. Door closing determination module 406 may be executed in processor 320, transportation management system 330, or a combination thereof. Door closing determination module 406 may receive sensor data from, without limitation, an accelerometer, a gyroscope, a barometer, a magnetometer, a global positioning unit, a timing unit, a microphone, a presence sensor, a radar sensor, or a combination thereof. As described in detail with respect to FIGS. 3, 5, 6, and 7, an inertial measurement unit may provide sensor data to door closing determination module 406 in order to detect a door closing event. Inertial measurement unit data 402 may provide sensor data from a gyroscope and/or an accelerometer. For example, the gyroscope sensor data may represent the pitch, roll, and yaw of the vehicle. Inertial measurement unit data 402 may also provide may include accelerometer sensor data associated with 3 orthogonal axis corresponding to vertical, transverse, and longitudinal axis of the vehicle. Fast Fourier Transform 404 may receive sensor data from inertial measurement unit data 402 in the time domain and transform the data into the frequency domain. The sensor data in the frequency domain may be provided to door closing determination module 406. Door closing determination module 406 may process the sensor data in the frequency domain and determine an event signature associated with the sensor data. Door closing determination module 406 may detect a door closing event based on the event signature by comparing the amplitude and frequency components (e.g., a signature pattern) of the sensor data from inertial measurement unit data 402 to known inertial signature patterns of door closing events to determine if a door closing event has occurred.

Additionally or alternatively, door closing determination module 406 may receive sensor data not associated with inertial movement of the vehicle. For example, sensor data 410 may include, without limitation, relative air pressure within the vehicle, magnetic field data, location data, ambient sound data, object presence data, or a combination thereof. Sensor data 410 may be provided to door closing determination module 406 in order to detect a door closing event. Sensor conditioning module 412 may receive sensor data 410 and process the data for use by door closing determination module 406. Sensor conditioning module 412 may process sensor data 410 using processes including, without limitation, linearization, amplification, filtering, frequency domain transformation, or a combination thereof. The conditioned sensor data may be provided to door closing determination module 406. Door closing determination module 406 may process the conditioned sensor data and determine an event signature associated with the conditioned sensor data. Door closing determination module 406 may detect a door closing event based on the event signature by comparing the amplitude and frequency components (e.g., a signature pattern) of sensor data to known sensor signature patterns of door closing events to determine if a door closing event has occurred.

Door closing determination module 406 may control the locking and unlocking of the vehicle doors (e.g., front right door, front left door, rear right door, rear left door, rear door, hood, trunk, etc.). Door closing determination module 406 may control the locking and unlocking of the vehicle doors by sending control messages to door lock module 408. Door lock module 408 may lock or unlock vehicle doors in order to control which side of the vehicle a transportation requestor is allowed access to. For example, a transportation provider may provide transportation services to a transportation requestor and stop the vehicle on the right side of a road to drop off the transportation requestor. The transportation provider may stop the vehicle alongside a curb or sidewalk of the right side of the vehicle. Door lock module 408 may lock a door on the left side of the vehicle and unlock a door on the right side of the vehicle, so the transportation requestor may exit the vehicle next to the curb or sidewalk.

A dynamic transportation network may provide information to a transportation requestor device (e.g., smartphone) and/or a transportation provider device (e.g., smartphone) related to transportation services. For example, a smartphone may display a route on a map associated with a transportation request. The route may be displayed on the map and include a pickup location, a travel route, and a drop-off location. Further, the smartphone may display messages to the transportation requestor and/or transportation provider associated with door usage guidance. For example, the smartphone may display a message providing guidance to the transportation requestor to enter the transportation provider vehicle from the right side of the vehicle at the pickup location. As another example, the smartphone may display a message providing guidance to the transportation requestor to exit the transportation provider vehicle from the left side of the vehicle at the drop-off location. A dynamic transportation network may detect door closing events based on sensor data, store a historical record of the door closing events, and determine transportation provider routing decisions based on the record of door closing events. In some examples, the routing decisions may include providing guidance on a smartphone to a transportation requestor to enter the transportation provider vehicle from the right side of the vehicle at a pickup location and exit the transportation provider vehicle from the left side of the vehicle at a drop-off location.

In some examples, detecting a door closing event on a transportation provider vehicle and recording a time stamp and location of the door closing event may create an accurate record of the actual times and locations of transportation pickups and drop-offs. Door closing determination module 406 may create a record of door opening and closing events and include the location, the time of day, and date associated with the door events. Door closing determination module 406 may store the record of door events in door closing record 414. Further, the record of door events may be uploaded to a server for access by a transportation management system for use in making routing decisions associated with transportation requestor pickup and drop-off locations.

In some examples, a transportation provider may begin a transportation service by picking up a passenger and signaling the beginning of the transportation service. The transportation provider may end a transportation service by dropping off the passenger and signaling the end of the transportation service. The transportation provider may signal the beginning or end of the transportation service using any suitable method. The transportation provider may signal the beginning or end of the transportation service by making an entry on a computing device (e.g., smartphone). The entry may be touching an icon indicating the beginning or end of the transportation service on a touchscreen of a smartphone. The signal indicating the beginning or end of the transportation service may be transmitted to a transportation management system. In some examples, a transportation provider may signal the beginning of a transportation service at a time and/or location that does not correspond to the actual pickup time or pickup location of the transportation requestor. In some examples, a transportation provider may signal the ending of a transportation service at a time and/or location that does not correspond to the actual drop off time or drop-off location of the transportation requestor. For example, a transportation provider may receive a request for transportation with a pickup location designated as pickup and drop-off location. The transportation provider may signal the beginning of the transportation service before actually picking up the transportation requestor thereby creating an inaccurate signaling of the time and/or location of picking up the transportation requestor. As another example, a transportation provider may receive a request for transportation with a drop-off location designated as pickup and drop-off location. The transportation provider may drop off the transportation requestor at pickup and drop-off location without signaling the end of the transportation service. The transportation provider may then at a later time signal the end of the transportation service after actually dropping off the transportation requestor thereby creating an inaccurate signaling of the time and/or location of dropping off the transportation requestor. In some examples, detecting a door closing event on a transportation provider vehicle and recording a time stamp and location of the door closing event may create an accurate record of the actual times and locations of transportation pickups and drop-offs. A dynamic transportation network may calculate a time difference between a time of a door closing event and a time of a signal associated with the beginning or end of a transportation service. A dynamic transportation network may also calculate a difference between a location of a door closing event and a location of a transportation provider device when a signal associated with the beginning or end of a transportation service is entered. Further, the dynamic transportation network may determine a transportation provider rating based at least in part on the time and/or location difference.

In some examples, the dynamic transportation network may estimate the location of a transportation requestor based on a Global Positioning System sensor and/or a choosing a location on a map application running on a computing device. The dynamic transportation network may then infer a more accurate pickup/drop-off location based on popular pickup/drop-off locations nearby. The more popular pickup/drop-off locations may be determined by the record of door closing event locations stored in a database. Additionally or alternatively, the dynamic transportation network may recommend a different pickup/drop-off location nearby that is more convenient and/or appropriate for the transportation requestor and/or the transportation provider.

In some examples, a specific street address may be provided for a location that covers a large geographic area (e.g., a shopping mall, an office complex, an event stadium, etc.). The street address may be an inconvenient and/or inappropriate pick/drop-off location. The dynamic transportation network may adjust the pickup/drop-off location to a nearby location that is more convenient and/or appropriate for the transportation requestor and/or the transportation provider. The adjusted pickup/drop-off locations may be based on the record of door closing event locations stored in a database. In some examples, the adjusted pickup/drop-off locations may be further based on feedback provided by transportation requestors that have previously been picked up or dropped off at the specific street address. The feedback from the transportation providers may indicate the level of convenience associated with the adjusted location. Creating a database of locations of door closing events determined using sensor data obtained from transportation provider computing devices may enable more accurate, reliable and convenient pickup and drop off locations for transportation requestors.

In some examples, the dynamic transportation network may identify discrepancies between a pickup and/or drop-off location requested by a transportation requestor and the actual location of the pickup and/or drop-off location. The pickup and/or drop-off location requested by a transportation requestor may be determined by the transportation requestor entering a location (e.g., address) of the pickup and/or drop-off location in an application of the transportation requestor's device, the location determined by a location determining system (e.g., GPS) in the transportation requestor's device, or a combination thereof. The actual location of the pickup and/or drop-off location may be determined by the location of a door closing event, the entry of a pickup/drop-off in the transportation provider's computing device, or a combination thereof. In some examples, the transportation requestor may provide feedback (e.g., through the transportation requestor's computing device) to the dynamic transportation network regarding the actual pickup/drop-off location. The transportation requestor's feedback may indicate that the actual pickup/drop-off location was not the transportation requestor's desired location. The dynamic transportation network may provide coaching to the transportation provider to assist the transportation provider in picking up/dropping off the transportation requestor at a location that is more desirable to the transportation requestor. In some examples there may be a consistent mismatch between the actual pickup/drop-off location and the requested pickup/drop-off location that may indicate the requested pickup/drop-off location is not an appropriate or convenient location. When there is a consistent mismatch, the dynamic transportation network may mark the location as inappropriate for pickup/drop-off and route transportation requestors to an alternate nearby location. The dynamic transportation network may obtain information regarding the inappropriate pickup/drop-off location through automated data collection (e.g., image sensors on vehicles or computing devices) and/or through investigative methods. The dynamic transportation network may update map data based on the collected data or investigation results.

Figure 5:
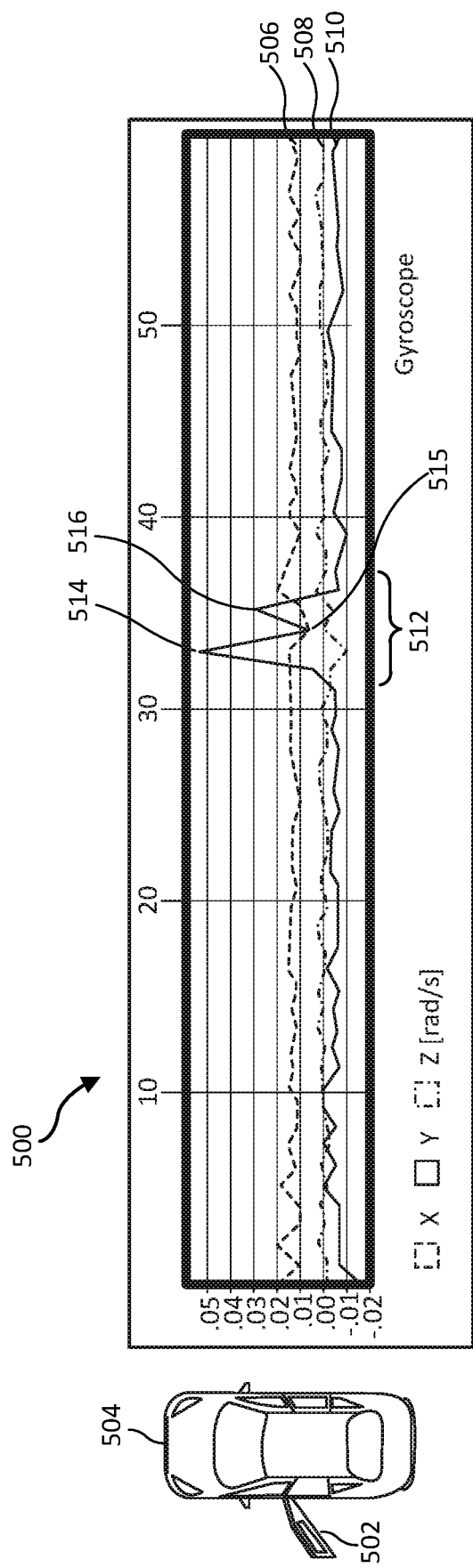
FIG. 5 is an example chart representing data from a gyroscope in a computing device.

FIG. 5 is an example chart representing example data from a gyroscope in a computing device. Chart 500 of FIG. 5 may represent sensor data from a gyroscope in a computing device of a transportation provider operating vehicle 504. When the computing device is securely attached to vehicle 504, the sensor data from the gyroscope may represent the angular velocity of vehicle 504 in multiple directions (e.g., 3 dimensional). For example, the sensor data may represent the pitch, roll, and yaw of vehicle 504. Chart 500 of FIG. 5 includes sensor data associated with 3 orthogonal axis. Sensor data from axis X, Y, and Z may correspond to the pitch, roll, and yaw, respectively, of vehicle 504. Chart 500 shows rotational velocity measure by the gyroscope over a 60 second time period and is represented by X axis 506, Y axis 510, and Z axis 510. Chart 500 may show the angular velocity of axis X, Y, and Z in radians per second. When left door 502 of vehicle 504 is closed, vehicle 504 may experience an impulse momentum imparted on vehicle 504. Closing left door 502 may have a momentum equal to the mass of door 502 times the velocity of the door as it is closing. The impulse momentum imparted on vehicle 504 may be transmitted to the securely mounted computing device in vehicle 504 that includes the gyroscope.

The plot of Y axis 510 may represent the roll axis (e.g., longitudinal axis extending from the front to the back of vehicle 504). When an impulse momentum is imparted on vehicle 504 due to the closing of left door 502, Y axis 510 may experience an impulse change in angular velocity. For example, when left door 502 is closed at time 32 seconds, Y axis 510 may experience an impulse peak 514 up to 0.05 radians per second. After left door 502 is closed, vehicle 504 may oscillate about the y axis. The oscillation may diminish over time and be dampened at a rate based upon the mass of vehicle 504 and the characteristics of vehicle 504's suspension. The gyroscope may sense the diminished oscillations as represented by the decrease in angular velocity following the initial impulse peak 514. Y axis 510 shows a waveform of the oscillation diminishing after approximately 4 seconds. The waveform of Y axis 510 during time period 512 may be the time period from the initial impulse peak 514 to when the oscillations have significantly dampened. The waveform of Y axis 510 during time period 512 may be an event signature that corresponds to a door closing event. In some examples, each door of vehicle 504 may have a unique event signature that corresponds to each of the doors. The event signature corresponding to a door closing may be determined in the time domain and may include without limitation, rates of change in angular velocity, amplitude thresholds, number of inflection points, time period windows, or a combination thereof. In some examples, the event signature corresponding to a door closing may be determined in the frequency domain and may include without limitation, Fast Fourier Transform analysis, spectrum analysis, harmonic analysis, or a combination thereof. In some examples, the event signature may be characterized by the amplitude of initial impulse peak 514 exceeding a threshold value. Although the left door closing event associated with the waveform of Y axis 510 during time period 512 is shown exceeding a threshold of 0.05 radians per second, any threshold level may be set in determining event signatures. For example, a threshold for initial impulse peak 514 when detecting left door 502 closing event may be set at 0.01 radians per second, 0.02 radians per second, 0.03 radians per second, 0.04 radians per second, 0.05 radians per second, 0.06 radians per second, 0.07 radians per second, or higher. Additionally or alternatively, the event signature may be characterized by the amplitude of initial impulse peak 514 exceeding a threshold value and subsequent peaks exceeding different threshold values. For example, first subsequent peak 515 may occur as vehicle 504 rolls back to the left after initially rolling to the right after the door closing event. First subsequent peak 515 may be detected crossing below a set threshold level. Second subsequent peak 516 may occur as vehicle 504 rolls back to the right for the second time after the door closing event. Second subsequent peak 516 may be detected crossing above a set threshold level. Although FIG. 5 shows two subsequent peaks, any number of subsequent peaks may be detected. Further, threshold crossing levels for subsequent peaks may be set at any level when detecting event signatures associated with door closing events. Event signatures may also include a series of peaks exceeding set thresholds for each of the peaks. Additionally or alternatively, event signatures for door closing events may be detected based on the time periods between peaks in angular velocity resulting from door closing impact. For example, a threshold may be set for the time period between peak 514 and 515. The event signature may include the time period between peak 514 and 515 being above or below a set threshold. The event signature may further include multiple time periods between peaks 514, 515, and 516 being above or below a set threshold.

Although the previous discussion of acquiring and analyzing an event signature due to a door closing impact concentrated on gyroscope Y axis 510 (e.g., the roll axis), the present disclosure is not limited to such. Additionally or alternatively, an impulse momentum due to vehicle 504's door closing may also be sensed by the X axis 506 (e.g., pitch axis) and Z axis 508 (e.g., yaw axis). The waveform of X axis 506 and Z axis 508 during time period 512 may also be a unique event signature for their respective axis corresponding to a door closing event. The event signatures of X axis 506 and Z axis 508 may also be analyzed using the methods described above with respect to y axis 510. In some examples, detecting a door closing event associated with a vehicle may be based on the event signatures of multiple axis. The event signatures of X axis 506, axis 510, Z axis 508, or a combination thereof may be used to detect a door closing event. The event signatures of X axis 506, axis 510, and Z axis 508 may be combined using different weighting for each of the axis. For example, the weightings for each of the axes may be based on the orientation of the transportation provider device that includes the gyroscope and is mounted to a vehicle. As described in FIG. 2, the transportation provider device may be mounted, for example, on the dashboard of the vehicle. When mounted on the dashboard, the orientation of the gyroscope's axis may not be aligned with the orientation of the vehicle's axis. Detecting a door closing event based on event signatures of multiple axis may include weighting the signatures of each of the gyroscope axis based on the relative orientation of the transportation provider's computing device to the vehicle's axis.

Figure 6:
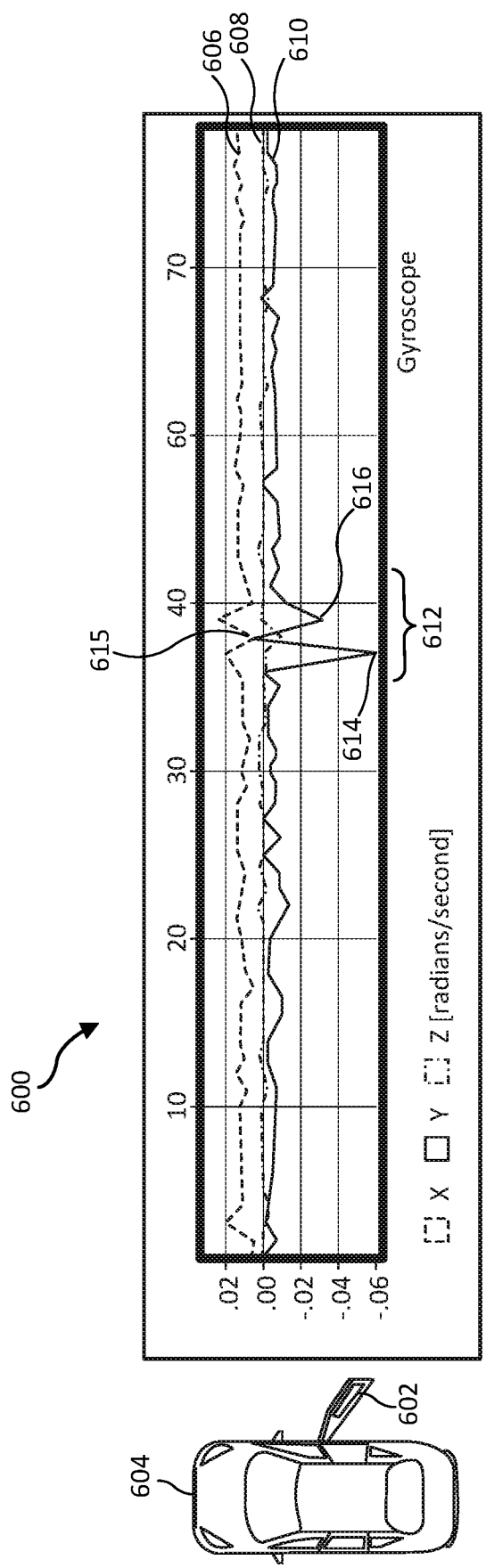
FIG. 6 is another example chart representing data from a gyroscope in a computing device.

FIG. 6 is another example chart representing example data from a gyroscope in a computing device. Similar to chart 500 of FIG. 5 described above, chart 600 of FIG. 6 may represent sensor data from a gyroscope in a computing device of a transportation provider operating vehicle 604. When the computing device is securely attached to vehicle 604, the sensor data from the gyroscope may represent the angular velocity of vehicle 604 in multiple directions (e.g., 3 dimensional). For example, the sensor data may represent the pitch, roll, and yaw of vehicle 604. Chart 600 of FIG. 6 includes sensor data associated with 3 orthogonal axis. Sensor data from axis x, y, and Z may correspond to the pitch, roll, and yaw, respectively, of vehicle 604. Chart 600 shows rotational velocity measure by the gyroscope over an 80 second time period and is represented by X axis 606, Y axis 610, and Z axis 608. Chart 600 may show the angular velocity of axis X, Y, and Z in radians per second. When right door 602 of vehicle 604 is closed, vehicle 604 may experience an impulse momentum imparted on vehicle 604. The waveform of Y axis 610 during time period 612 may be the time period from the initial impulse to when the oscillations have significantly dampened. The waveform of Y axis 610 during time period 612 may be an event signature that corresponds to a door closing event. In some examples, each door of vehicle 604 may have a unique event signature that corresponds to each of the doors. The event signature corresponding to right door 602 closing may be determined using the methods described above with respect to left door 502 closing. In some examples, the event signature may be characterized by the amplitude of initial impulse peak 614 exceeding a threshold value. Although the left door closing event associated with the waveform of Y axis 610 during time period 612 is shown exceeding a threshold of −0.06 radians per second, any threshold level may be set. For example, a threshold for initial impulse peak 614 when detecting right door 602 closing event may be set at −0.01 radians per second, −0.02 radians per second, −0.03 radians per second, −0.04 radians per second, −0.05 radians per second, −0.06 radians per second, −0.07 radians per second, or higher in amplitude. Additionally or alternatively, the event signature may be characterized by the amplitude of initial impulse peak 614 exceeding a threshold value and subsequent peaks exceeding different threshold values. For example, first subsequent peak 615 may occur as vehicle 604 rolls back to the right after initially rolling to the left. First subsequent peak 615 may be detected crossing a set threshold level. Second subsequent peak 616 may occur as vehicle 604 rolls back to the left for the second time after the door closing event. Second subsequent peak 616 may be detected crossing a set threshold level. Although FIG. 6 shows two subsequent peaks, any number of subsequent peaks may be detected. Further, threshold crossing levels for subsequent peaks may be set at any level when detecting event signatures associated with door closing events. Event signatures may also include a series of peaks exceeding set thresholds for each of the peaks. Additionally or alternatively, event signatures for door closing events may be detected based on the time periods between peaks in angular velocity resulting from door closing impact. For example, a threshold may be set for the time period between peak 614 and 615. The event signature may include the time period between peak 614 and 615 being above or below a set threshold. The event signature may further include multiple time periods between peaks 614, 615, and 616 being above or below a set threshold.

Event signatures of y axis 510 and y axis 610 may represent an angular velocity vector. Components of the angular velocity vector may include a speed of rotation and a direction of rotation. Comparing the event signatures of y axis 510 and y axis 610 show that the direction of rotation of the impulse imparted to the vehicle from left door 502 closing is opposite the impulse direction from right door 602 closing. Therefore, determining on which side a door closing events occurs may be based on a direction component of the event signature. The event signature of y axis 510 experiences an impulse up to 0.05 radians per second after left door 502 is closed. The event signature of y axis 610 experiences an impulse up to −0.06 radians per second after right door 602 is closed indicating an impulse in the opposite direction of left door 502 closing.

As described above, rotation and movement of a vehicle resulting from the impact of a door closing may be based on, without limitation, factors including the mass of the door, the mass of the vehicle, the speed of door closing, the suspension of the vehicle, or a combination thereof. These factors may be different for different types of vehicles (e.g., vehicle manufacturer, vehicle model, vehicle options, etc.). The present disclosure includes detecting a door closing event based on event signatures while remaining agnostic to the type of vehicle. The disclosed methods and devices for detecting door closing events may be independent of the type of vehicle.

Additionally or alternatively, the present disclosure may include detecting a door closing event based on event signatures that are specific to the type of vehicle (e.g., make and model) and/or to a specific vehicle (e.g., a transportation provider's vehicle). The disclosed methods and devices for detecting door closing events may increase the accuracy of detecting door closing events while reducing the occurrence of false positive and false negative door closing detection by taking into account the specific characteristics of the vehicle. For example, a door closing event signature may be affected by the characteristics of the vehicle. The characteristics of the vehicle affecting the event signature may include, without limitation, the vehicle's suspension system, the state of maintenance of the vehicle, vehicle weight, vehicle cabin size, vehicle modifications, the state of the vehicle windows (e.g., open, partially open, closed). Each of the aforementioned characteristics may impact the door closing event signature. The characteristics may be determined by, for example, receiving the characteristics from the manufacturer of the vehicle (e.g., accessing a database of characteristics), receiving the characteristics from the vehicle (e.g., through communication with the vehicle sensors), sensing the characteristics of the vehicle (e.g., by analyzing the signature created by particular known situations that the vehicle experiences), or a combination thereof. In some examples, sensing the characteristics of the suspension of the vehicle may include measuring the reaction of the vehicle to a known impact. For example, collecting IMU data (e.g., gyroscope data, accelerometer data) while the vehicle traverses a railroad crossing may determine specific characteristics of the vehicle's suspension and suspension response.

Figure 7:
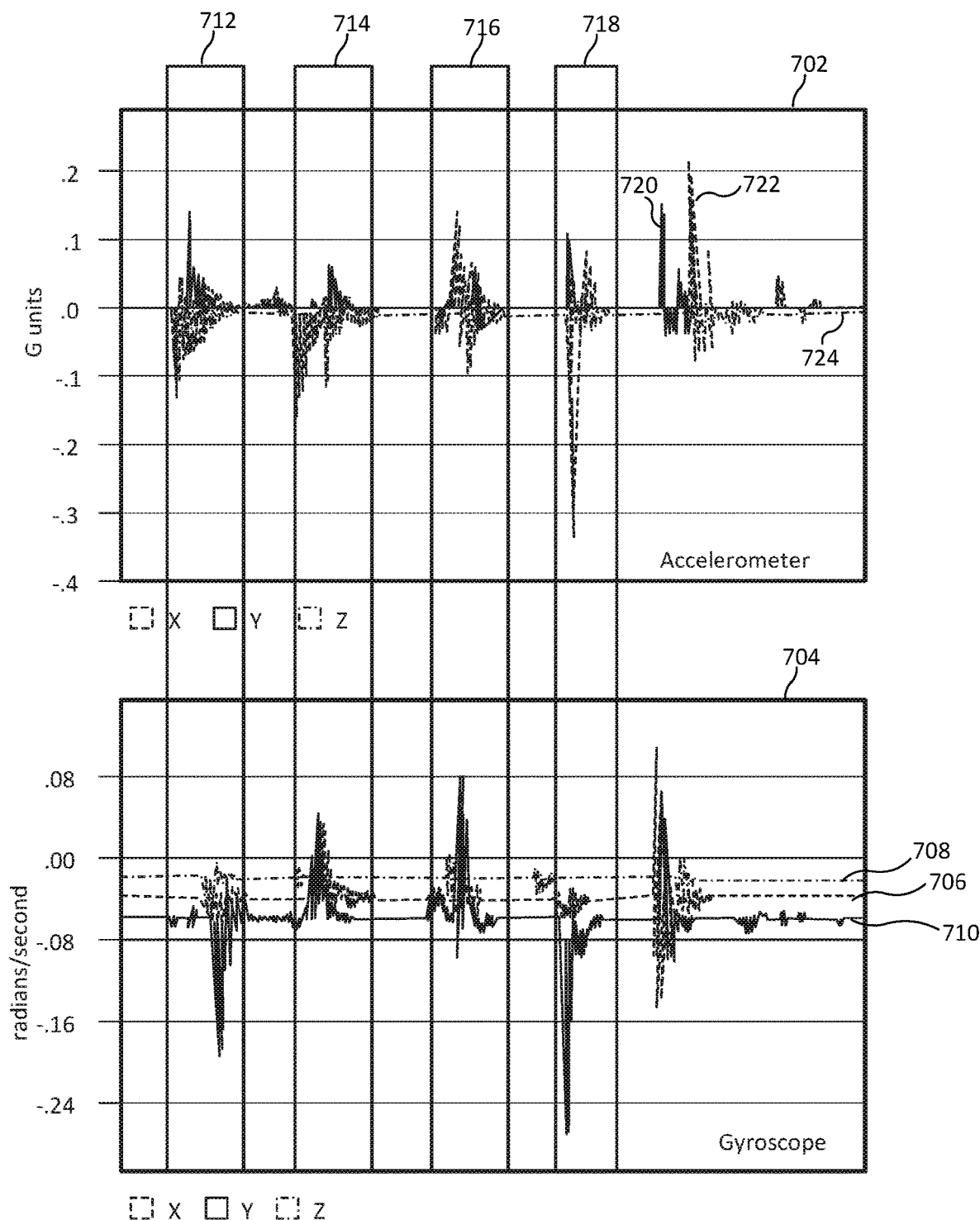
FIG. 7 is a chart representing example data from a gyroscope and an accelerometer in a computing device.

FIG. 7 is a chart representing example data from a gyroscope and an accelerometer in a computing device. Similar to chart 500 of FIG. 5 and chart 600 of FIG. 6, FIG. 7 shows chart 702 that may represent sensor data from an accelerometer and chart 704 that may represent sensor data from a gyroscope in a computing device of a transportation provider. When the computing device is securely attached to the vehicle, the sensor data from the gyroscope may represent the angular velocity of the vehicle in multiple directions (e.g., 3 dimensional). The sensor data from the accelerometer may represent the linear acceleration of the vehicle in multiple directions (e.g., 3 dimensional). The computing device may simultaneously receive sensor data from the gyroscope and the accelerometer.

The gyroscope data may represent the pitch, roll, and yaw of the vehicle. Chart 704 may include gyroscope data associated with 3 orthogonal axis. Gyroscope data from axis X, Y, and Z may correspond to the pitch, roll, and yaw, respectively, of the vehicle. Chart 704 shows rotational velocity measured by the gyroscope and is represented by X axis 706, Y axis 710, and Z axis 708. Chart 704 may show the angular velocity of axis X, Y, and Z in radians per second.

The accelerometer data may represent the linear acceleration of the vehicle. Chart 702 may include accelerometer data associated with 3 orthogonal axis corresponding to vertical, transverse, and longitudinal axis of the vehicle. Chart 702 shows linear acceleration measured by the accelerometer and is represented by X axis 722, Y axis 720, and Z axis 724. Chart 702 may show the linear acceleration of X axis 722, Y axis 720, and Z axis 724 in G units (e.g., meters/second/second).

When a door of the vehicle is closed, the vehicle may experience an impact. For example, during time period 712 a right rear side door may be closed, during time period 714 a left rear side door may be closed, during time period 716 a left front side door may be closed, and during time period 718 a right front side door may be closed. Each of the door closing events may produce gyroscope and accelerometer sensor data that corresponds to the door closing event. In some examples, the gyroscope and accelerometer may record a unique event signature that corresponds to each of the door closing events. The event signatures corresponding to the door closing events during time periods 712, 714, 716, and 718 may be determined using the methods described above with respect to FIGS. 3-6. For example, during time period 712, the accelerometer data will show an initial increase in amplitude (e.g., impulse) and a reducing oscillation while the y axis 710 of the gyroscope shows an initial increase in amplitude in the negative rotational direction. Similarly, during time period 718, the accelerometer data will also show an initial increase in amplitude (e.g., impulse) and a reducing oscillation while the y axis 710 of the gyroscope shows an initial increase in amplitude higher than during time period 712 but also in the negative rotational direction. During time period 714, the accelerometer data will also show an initial increase in amplitude (e.g., impulse) and a reducing oscillation while the y axis 710 of the gyroscope shows an initial increase in amplitude in the positive rotational direction. Similarly, during time period 716, the accelerometer data will also show an initial increase in amplitude (e.g., impulse) and a reducing oscillation while the y axis 710 of the gyroscope shows an initial increase in amplitude higher than during time period 714 but also in the positive rotational direction. The event signatures associated with chart 704 showing rotational velocity measured by a gyroscope may be determined by the methods described in detail with respect to FIGS. 5 and 6. Additionally or alternatively, door closing events may be determined by the combination of gyroscope event signatures and accelerometer event signatures. The accelerometer associated with chart 702 may sense linear acceleration. When a vehicle experiences an impact due to a door closing, the vehicle reacts with both rotational movements (as sensed and measured by the gyroscope) and linear motion (as sensed and measured by the accelerometer). The event signature methods described above for detecting peak thresholds and time period thresholds of gyroscope data may also be applied to peak thresholds and time period thresholds of accelerometer data.

Figure 7A:
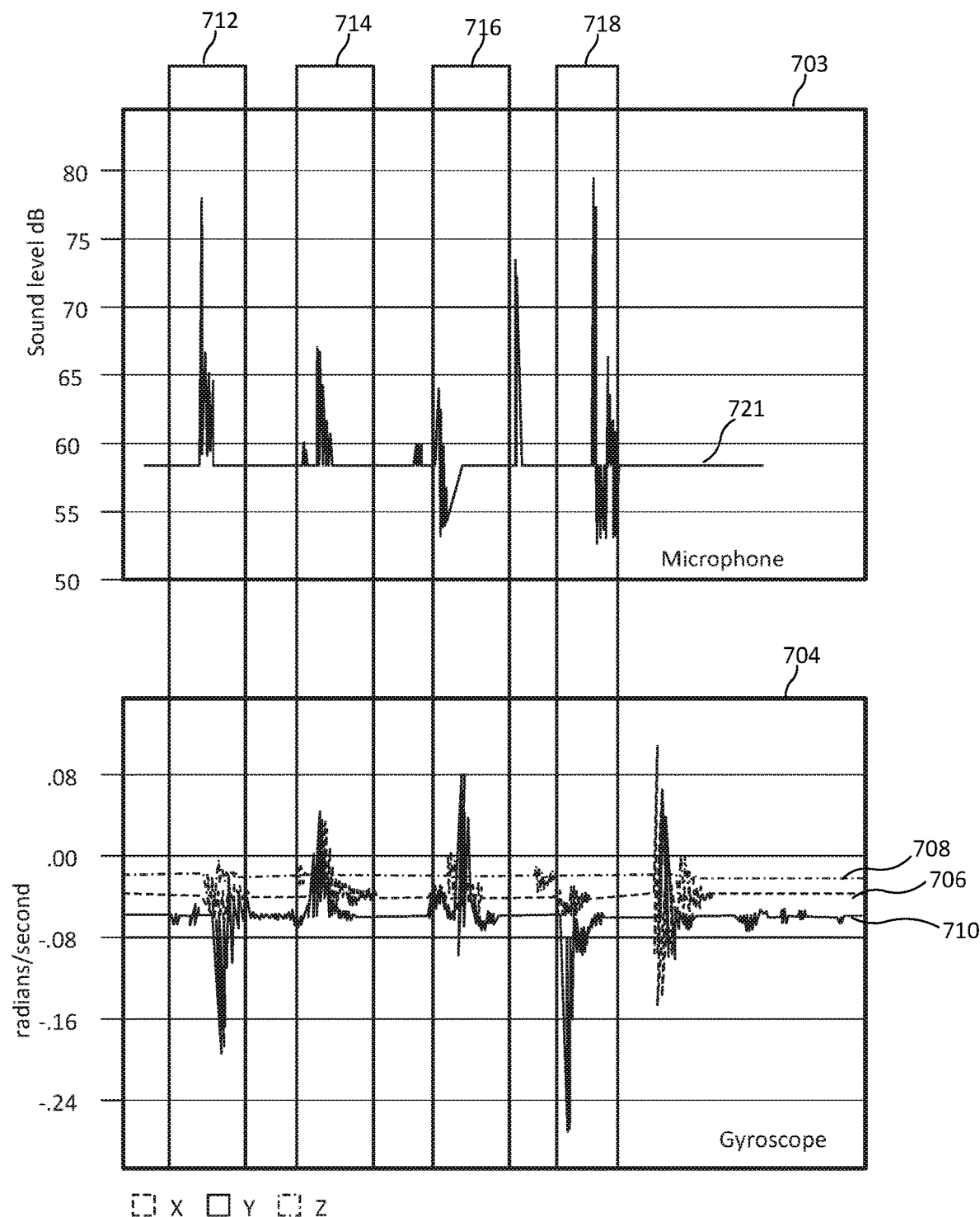
FIG. 7A is a chart representing example data from a gyroscope and a microphone in a computing device.

FIG. 7A is a chart representing example data from a gyroscope and a microphone in a computing device. Similar to chart 500 of FIG. 5 and chart 600 of FIG. 6, FIG. 7A shows chart 703 that may represent sound data from a microphone and chart 704 that may represent sensor data from a gyroscope in a computing device. When the computing device is securely attached to the vehicle, the sensor data from the gyroscope may represent the angular velocity of the vehicle in multiple directions (e.g., 3 dimensional). The sensor data from the microphone may represent the sound pressure level inside the cabin of the vehicle. The computing device may simultaneously receive sensor data from the gyroscope and sound pressure levels from the microphone.

The gyroscope data may represent the pitch, roll, and yaw of the vehicle. Chart 704 may include gyroscope data associated with 3 orthogonal axis. Gyroscope data from axis X, Y, and Z may correspond to the pitch, roll, and yaw, respectively, of the vehicle. Chart 704 shows rotational velocity measured by the gyroscope and is represented by X axis 706, Y axis 710, and Z axis 708. Chart 704 may show the angular velocity of axis X, Y, and Z in radians per second. The sound pressure level data in chart 703 may represent the sound pressure levels inside the cabin measured in dB.

When a door of the vehicle is closed, the vehicle may experience an impact. For example, during time period 712 a right rear side door may be closed, during time period 714 a left rear side door may be closed, during time period 716 a left front side door may be closed, and during time period 718 a right front side door may be closed. Each of the door closing events may produce gyroscope and sound level data that corresponds to the door closing event. In some examples, the gyroscope and microphone may record a unique event signature that corresponds to each of the door closing events. The event signatures corresponding to the door closing events during time periods 712, 714, 716, and 718 may be determined using the methods described above with respect to FIGS. 3-6. For example, during time period 712, the sound level data may show an initial increase in amplitude (e.g., impulse) when the door closes and a dampened level from echoes in the vehicle cabin while they axis 710 of the gyroscope may show an initial increase in amplitude in the negative rotational direction. Similarly, during time period 718, the sound level data may also show an initial increase in amplitude (e.g., impulse) and a dampened level from echoes while the y axis 710 of the gyroscope may show an initial increase in amplitude higher than during time period 712 but also in the negative rotational direction. During time period 714, the sound level data may also show an initial increase in amplitude (e.g., impulse) and a subsequent dampened level while the y axis 710 of the gyroscope may show an initial increase in amplitude in the positive rotational direction. Similarly, during time period 716, the sound level data may also show an initial increase in amplitude (e.g., impulse) and a subsequent dampened level while the y axis 710 of the gyroscope may show an initial increase in amplitude higher than during time period 714 but also in the positive rotational direction. The event signatures associated with chart 704 showing rotational velocity measured by a gyroscope may be determined by the methods described in detail with respect to FIGS. 5 and 6.

Additionally or alternatively, door closing events may be determined by the combination of gyroscope event signatures and sound pressure event signatures. A combined (e.g., gyroscope and sound pressure level) event signature may increase the accuracy of detecting car door closing events. By correlating a gyroscope event signature with a sound level event signature false positive and/or false negative door closing detection may be reduced. For example, if a vehicle receives an impact not due to a door closing (e.g. from an external object/person impacting the vehicle or from a passing truck creating an air pressure wave) an event signature from a gyroscope alone may falsely indicate a door closing event. A vehicle impact not due to a door closing event may generate a sound level signature distinguishable from a door closing sound level signature while the gyroscope data signature may not be able to distinguish between the door closing event and an impact due to another source. By correlating the gyroscope and sound level signatures a more robust (e.g. reducing false positive detection and/or false negative detection) event signature detection method is created. Correlating the gyroscope and sound level signatures may use any suitable method. For example, correlation methods may include time synchronization (e.g., temporal correlation) of peaks detected by the gyroscope and microphone and a weighting applied to each of the gyroscope and sound level signatures. In some examples, a machine learning model may be applied to the event signature methods independently or in a combined manner. The machine learning model may be developed by providing training sets of known gyroscope and/or sound level data associated with door closing events to the model.

In some examples, the microphone (e.g., audio transducer) associated with chart 703 may sense sound from multiple sources in addition to the car door closing. Sound sources other than door closings (e.g. vehicle entertainment system, conversations, engine noise, nearby vehicles, external sounds, etc.) may be considered interference when detecting door closing events. Filtering and digital processing techniques may be used to reduce the effects of the sound interference and increase the accuracy of methods to detect door closing events using sound level signatures. Further, the characteristics of the door may affect the sound pressure signature. The characteristics of the door may include, without limitation, the position of the door window, the weight of the door, the type and friction of the hinges, the condition of the door gaskets, and a velocity of the door when closing. Sensors in the vehicle and/or the mobile device may sense the position (e.g. open, closed, partially open) of the window. Additionally, the position of the window may be determined based on characterized sound pressure signatures associated with correlated sensor events (e.g., a door closing signature event being indicated by the gyroscope without a corresponding sound wave signature being recognized may indicate that another door or window is open, altering the sound wave). A processor (e.g. processor 320) may determine the amplitude and frequency components of the recorded sound levels using processing techniques including, without limitation, Fast Fourier Transform, time domain digital signal processing, linearization, filtering, finite impulse response, or a combination thereof. In some examples, processor 320 may compare the amplitude and frequency components (e.g., a sound wave pattern) of the recorded sound wave to known sound wave patterns of door closing events to determine if a door closing event has occurred.

In some examples, a computing device (e.g., a transportation provider device mounted to a vehicle) may receive sensor data from a gyroscope and an accelerometer and determine a door closing event signature based on the sensor data. Further the computing device may determine which door of the vehicle was closed based on the event signature. Although the previous discussion described front, rear, left, and right door closing event detection, the present disclosure is not limited to such and the methods may be used to detect hood closing, trunk closing, and impacts due to collisions with external objects. Further, the methods may be used to localize the area of impact on the vehicle.

Although the description of FIGS. 5, 6, and 7 show an accelerometer and gyroscope within the transportation provider's computing device being used to detect a door closing event, the present disclosure is not limited to such. Any computing device within the vehicle that includes an inertial measuring unit may be used to detect a door closing event. For example, other computing devices with inertial measuring units may be used including, without limitation, a transportation requestors computing device (e.g., smartphone), a dashboard mounted computing device, a vehicle computing device, a head-mounted computing device, or a combination thereof.

Figure 8:
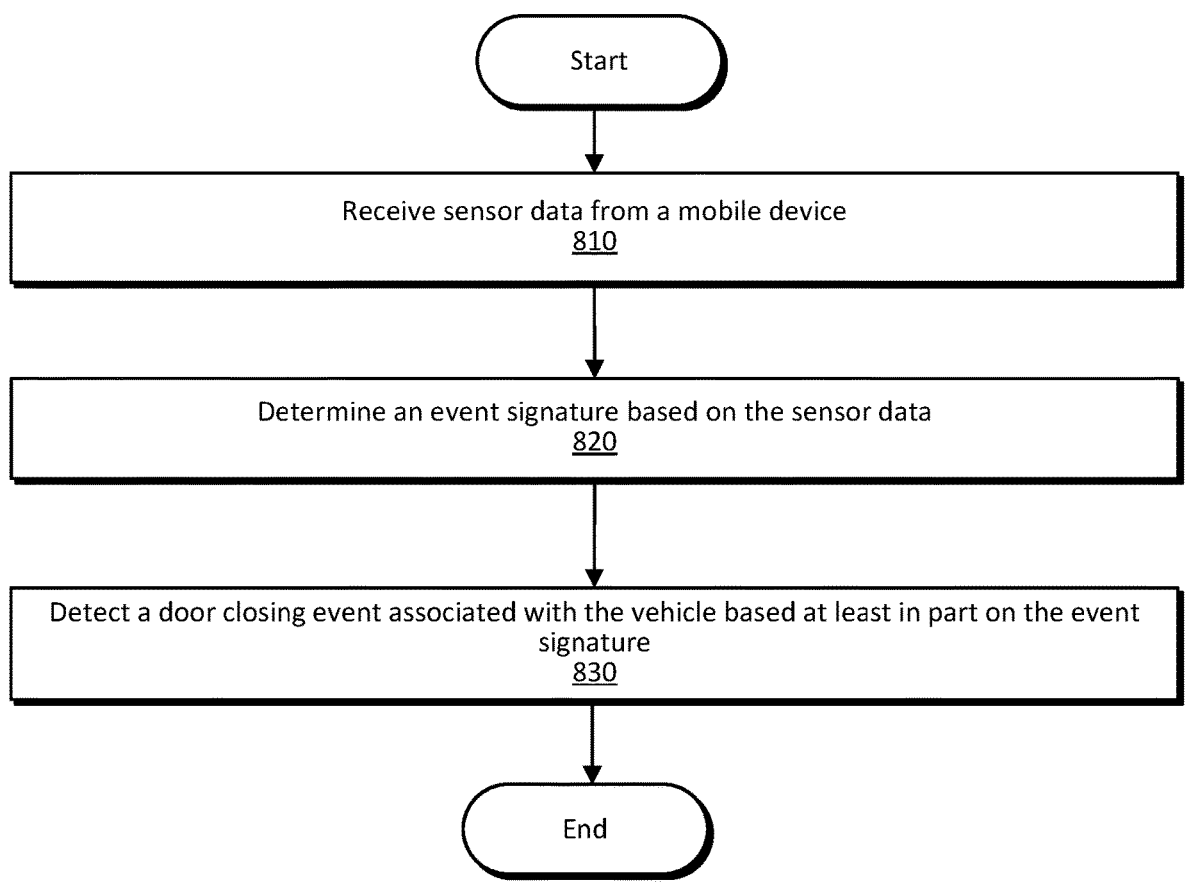
FIG. 8 is a flow diagram of an example method for detecting vehicle door closing events.

FIG. 8 is a flow diagram of an example method for detecting a vehicle door closing. As shown in FIG. 8, the method may include, at step 810, receiving sensor data from a mobile device, wherein the sensor data may include at least one of an angular velocity vector, a linear acceleration vector, and a rotational acceleration vector recorded over a period of time. At step 820, the method may include determining an event signature based on the sensor data. At step 830, the method may include detecting a door closing event associated with the vehicle based at least in part on the event signature.

In one example, a computer-implemented method for detecting a vehicle door closing may include receiving sensor data associated with a mobile device associated with a vehicle, wherein the sensor data may include at least one of an angular velocity vector, a linear acceleration vector, and a rotational acceleration vector recorded over a period of time. In some examples, the method may further include determining an event signature based on the sensor data. In some examples, the method may further include detecting a door closing event associated with the vehicle based at least in part on the event signature.

In some examples, the method may further include determining a location of the door closing event, wherein the door closing event is caused by a transportation requestor entering or exiting the vehicle, begin a transportation service within a dynamic transportation network in response to the transportation requestor entering the vehicle, and ending the transportation service in response to the transportation requestor exiting the vehicle.

In some examples, the method may further include determining whether the door closing event is a door closing event on a left side of the vehicle or a right side of the vehicle based on a direction component of the at least one of an angular velocity vector, a linear acceleration vector, and a rotational acceleration vector.

In some examples, the sensor data may be received from at least one of an accelerometer, a gyroscope, a barometer, a microphone, and a magnetometer.

In some examples, the method may further include determining that the event signature is associated with an impulse momentum to the vehicle, wherein the impulse momentum is caused by force transferred from the door closing event.

In some examples, determining the event signature may include processing the sensor data in a frequency domain and assigning weights to the sensor data, wherein the assigned weights are based on a relative orientation of the transportation provider device to the vehicle.

In some examples, the method may further include receiving additional sensor data from at least one of a global positioning unit, a timing unit, a microphone, a presence sensor, and a radar sensor in the transportation provider device, wherein detecting the door closing event associated with the vehicle may be further based on the additional sensor data.

In some examples, the method may further include receiving sensor data from a gyroscope of the mobile device, receiving sound level data from a microphone of the mobile device, and processing a temporal correlation between the sensor data from the gyroscope and the sound level data from the microphone, wherein detecting the door closing event associated with the vehicle is based on the temporal correlation between the sensor data from the gyroscope and the sound level data from the microphone.

In some examples, determining the event signature based on the sensor data may be agnostic to a type of the vehicle.

In some examples, determining the event signature based on the sensor data may be specific to a type of the vehicle.

In some examples, determining the event signature based on the sensor data is specific to a context of the vehicle, wherein the context of the vehicle includes at least one of a location of the vehicle, a level of sound within the vehicle, a mounting condition of the mobile device, and a suspension response of the vehicle.

In some examples, the method may further include determining a number of transportation requestors that have entered the vehicle based at least in part on a number of door closing events, determining a number of transportation requestors that have entered the vehicle based at least in part on a number of door closing events, comparing the number of transportation requestors that have entered the vehicle to a number of transportation requestors scheduled for a transportation service, determining all transportation requestors scheduled for the transportation service have entered the vehicle based on the comparison, and starting the transportation service.

In some examples, the method may further include storing a record of door closing events, storing a record of locations associated with the door closing events, and controlling at least one door locking mechanism based at least on the record of door closing events and the record of locations associated with the door closing events, wherein controlling the at least one door locking mechanism may control transportation requestor access to the vehicle.

In addition, a corresponding system for detecting a vehicle door closing may include one or more physical processors and one or more memories coupled to one or more of the physical processors, the one or more memories comprising instructions operable when executed by the one or more physical processors to cause the system to perform operations including receiving sensor data associated with a mobile device associated with a vehicle, determining an event signature based on the sensor data, and detecting a door closing event associated with the vehicle based at least in part on the event signature, wherein the sensor data may include at least one of an angular velocity vector, a linear acceleration vector, and a rotational acceleration vector recorded over a period of time.

In some examples, the operations may further include determining whether the door closing event is a door closing event on a left side of the vehicle or a right side of the vehicle based on a direction component of the at least one of an angular velocity vector, a linear acceleration vector, and a rotational acceleration vector.

In some examples, the sensor data may be received from at least one of an accelerometer, a gyroscope, a barometer, a microphone, and a magnetometer.

In some examples, determining the event signature may include processing the sensor data in a frequency domain, and assigning weights to the sensor data, wherein the assigned weights may be based on a relative orientation of the transportation provider device to the vehicle.

In some examples, the operations may further include receiving additional sensor data from at least one of a global positioning unit, a timing unit, a microphone, a presence sensor, and a radar sensor in the transportation provider device, wherein detecting the door closing event associated with the vehicle may be further based on the additional sensor data.

In some examples, determining the event signature based on the sensor data may be agnostic to a type of the vehicle.

In one example, a non-transitory computer-readable storage medium may include computer-readable instructions that, when executed by at least one processor of a computing device, cause the computing device to receive sensor data associated with a mobile device associated with a vehicle, determine an event signature based on the sensor data, and detect a door closing event associated with the vehicle based at least in part on the event signature, wherein the sensor data may include at least one of an angular velocity vector, a linear acceleration vector, and a rotational acceleration vector recorded over a period of time.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(n) (e.g., whether integrated into the vehicle, permanently affixed to the vehicle, temporarily affixed to the vehicle, worn by a driver of the vehicle, etc.). In some examples, provider devices 930 may include a provider apps 940(1)-(k). Provider apps 940(1)-(k) may represent any application, program, and/or module that may provide one or more services related to operating a vehicle and/or providing transportation matching services. For example, provider apps 940(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 940(1)-(k) may match the user of provider apps 940(1)-(k) (e.g., a transportation provider) with transportation requestors through communication with dynamic transportation matching system 910. In addition, and as is described in greater detail below, provider apps 940(1)-(k) may provide dynamic transportation management system 910 with information about a provider (including, e.g., the current location of the provider and/or vehicle) to enable dynamic transportation management system 910 to provide dynamic transportation matching and/or management services for the provider and one or more requestors. In some examples, provider apps 940(1)-(k) may coordinate communications and/or a payment between a requestor and a provider. According to some embodiments, provider apps 940(1)-(*k*) may provide a map service, a navigation service, a traffic notification service, and/or a geolocation service.

Additionally, as shown in FIG. 9, dynamic transportation matching system 910 may communicate with requestor devices 950(1)-(*m*). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

FIG. 10 shows a transportation management environment 1000, in accordance with various embodiments. As shown in FIG. 10, a transportation management system 1002 may run one or more services and/or software applications, including identity management services 1004, location services 1006, ride services 1008, and/or other services. Although FIG. 10 shows a certain number of services provided by transportation management system 1002, more or fewer services may be provided in various implementations. In addition, although FIG. 10 shows these services as being provided by transportation management system 1002, all or a portion of any of the services may be processed in a distributed fashion. For example, computations associated with a service task may be performed by a combination of transportation management system 1002 (including any number of servers, databases, etc.), one or more devices associated with a provider (e.g., devices integrated with managed vehicles 1014(*a*), 1014(*b*), and/or 1014(*c*); provider computing devices 1016 and tablets 1020; and transportation management vehicle devices 1018), and/or more or more devices associated with a ride requestor (e.g., the requestor's computing devices 1024 and tablets 1022). In some embodiments, transportation management system 1002 may include one or more general purpose computers, server computers, clustered computing systems, cloud-based computing systems, and/or any other computing systems or arrangements of computing systems. Transportation management system 1002 may be configured to run any or all of the services and/or software components described herein. In some embodiments, the transportation management system 1002 may include an appropriate operating system and/or various server applications, such as web servers capable of handling hypertext transport protocol (HTTP) requests, file transfer protocol (FTP) servers, database servers, etc.

In some embodiments, identity management services 1004 may be configured to perform authorization services for requestors and providers and/or manage their interactions and/or data with transportation management system 1002. This may include, e.g., authenticating the identity of providers and determining that they are authorized to provide services through transportation management system 1002. Similarly, requestors' identities may be authenticated to determine whether they are authorized to receive the requested services through transportation management system 1002. Identity management services 1004 may also manage and/or control access to provider and/or requestor data maintained by transportation management system 1002, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1002 may also manage and/or control access to provider and/or requestor data stored with and/or obtained from third-party systems. For example, a requester or provider may grant transportation management system 1002 access to a third-party email, calendar, or task management system (e.g., via the user's credentials). As another example, a requestor or provider may grant, through a mobile device (e.g., 1016, 1020, 1022, or 1024), a transportation application associated with transportation management system 1002 access to data provided by other applications installed on the mobile device. In some examples, such data may be processed on the client and/or uploaded to transportation management system 1002 for processing.

In some embodiments, transportation management system 1002 may provide ride services 1008, which may include ride matching and/or management services to connect a requestor to a provider. For example, after identity management services module 1004 has authenticated the identity a ride requestor, ride services module 1008 may attempt to match the requestor with one or more ride providers. In some embodiments, ride services module 1008 may identify an appropriate provider using location data obtained from location services module 1006. Ride services module 1008 may use the location data to identify providers who are geographically close to the requestor (e.g., within a certain threshold distance or travel time) and/or who are otherwise a good match with the requestor. Ride services module 1008 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1008 may use rule-based algorithms and/or machine-learning models for matching requestors and providers.

Transportation management system 1002 may communicatively connect to various devices through networks 1010 and/or 1012. Networks 1010 and 1012 may include any combination of interconnected networks configured to send and/or receive data communications using various communication protocols and transmission technologies. In some embodiments, networks 1010 and/or 1012 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1010 and/or 1012 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1010 and/or 1012 may include any combination of networks described herein or any other type of network capable of facilitating communication across networks 1010 and/or 1012.

In some embodiments, transportation management vehicle device 1018 may include a provider communication device configured to communicate with users, such as drivers, passengers, pedestrians, and/or other users. In some embodiments, transportation management vehicle device 1018 may communicate directly with transportation management system 1002 or through another provider computing device, such as provider computing device 1016. In some embodiments, a requestor computing device (e.g., device 1024) may communicate via a connection 1026 directly with transportation management vehicle device 1018 via a communication channel and/or connection, such as a peer-to-peer connection, Bluetooth connection, NFC connection, ad hoc wireless network, and/or any other communication channel or connection. Although FIG. 10 shows particular devices communicating with transportation management system 1002 over networks 1010 and 1012, in various embodiments, transportation management system 1002 may expose an interface, such as an application programming interface (API) or service provider interface (SPI) to enable various third parties which may serve as an intermediary between end users and transportation management system 1002.

In some embodiments, devices within a vehicle may be interconnected. For example, any combination of the following may be communicatively connected: vehicle 1014, provider computing device 1016, provider tablet 1020, transportation management vehicle device 1018, requestor computing device 1024, requestor tablet 1022, and any other device (e.g., smart watch, smart tags, etc.). For example, transportation management vehicle device 1018 may be communicatively connected to provider computing device 1016 and/or requestor computing device 1024. Transportation management vehicle device 1018 may establish communicative connections, such as connections 1026 and 1028, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1002 using applications executing on their respective computing devices (e.g., 1016, 1018, 1020, and/or a computing device integrated within vehicle 1014), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1014 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1002. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

FIG. 11 shows a data collection and application management environment 1100, in accordance with various embodiments. As shown in FIG. 11, management system 1102 may be configured to collect data from various data collection devices 1104 through a data collection interface 1106. As discussed above, management system 1102 may include one or more computers and/or servers or any combination thereof. Data collection devices 1104 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1106 can include, e.g., an extensible device framework configured to support interfaces for each data collection device. In various embodiments, data collection interface 1106 may be extended to support new data collection devices as they are released and/or to update existing interfaces to support changes to existing data collection devices. In various embodiments, data collection devices may communicate with data collection interface 1106 over one or more networks. The networks may include any network or communication protocol as would be recognized by one of ordinary skill in the art, including those networks discussed above.

As shown in FIG. 11, data received from data collection devices 1104 can be stored in data store 1108. Data store 1108 may include one or more data stores, such as databases, object storage systems and services, cloud-based storage services, and other data stores. For example, various data stores may be implemented on a non-transitory storage medium accessible to management system 1102, such as historical data store 1110, ride data store 1112, and user data store 1114. Data stores 1108 can be local to management system 1102, or remote and accessible over a network, such as those networks discussed above or a storage-area network or other networked storage system. In various embodiments, historical data 1110 may include historical traffic data, weather data, request data, road condition data, or any other data for a given region or regions received from various data collection devices. Ride data 1112 may include route data, request data, timing data, and other ride related data, in aggregate and/or by requestor or provider. User data 1114 may include user account data, preferences, location history, and other user-specific data. Although certain data stores are shown by way of example, any data collected and/or stored according to the various embodiments described herein may be stored in data stores 1108.

As shown in FIG. 11, an application interface 1116 can be provided by management system 1102 to enable various apps 1118 to access data and/or services available through management system 1102. Apps 1118 may run on various user devices (including provider and requestor computing devices, such as those discussed above) and/or may include cloud-based or other distributed apps configured to run across various devices (e.g., computers, servers, or combinations thereof). Apps 1118 may include, e.g., aggregation and/or reporting apps which may utilize data 1108 to provide various services (e.g., third-party ride request and management apps). In various embodiments, application interface 1116 can include an API and/or SPI enabling third party development of apps 1118. In some embodiments, application interface 1116 may include a web interface, enabling web-based access to data 1108 and/or services provided by management system 1102. In various embodiments, apps 1118 may run on devices configured to communicate with application interface 1116 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying linear acceleration signals as a function of time from one or more sensors corresponding to a mobile device mounted to an interior cabin portion of a vehicle;
   utilizing a door-closing model to determine a door-closing event
   of a door from a plurality of doors associated with the vehicle based on the linear acceleration signals; and
   generating at least one of a transportation-initiation signal or a transportation-completion signal based on the door-closing event.

2. The computer-implemented method of claim 1, further comprising:
   identifying rotational velocity signals as a function of time from the one or more sensors corresponding to the mobile device; and
   utilizing the door-closing model to determine the door-closing event further based on the rotational velocity signals.

3. The computer-implemented method of claim 1, further comprising:
   identifying rotational acceleration signals as a function of time from the one or more sensors corresponding to the mobile device; and
   utilizing the door-closing model to determine the door-closing event further based on the rotational acceleration signals.

4. The computer-implemented method of claim 1, further comprising:
   identifying, from one or more additional sensors associated with the mobile device or a transportation provider computing device separate from the mobile device, at least one of:
   sound level data based on sound levels recorded inside the vehicle;
   relative air pressure level data based on an ambient air pressure recorded inside the vehicle; and
   image data based on images recorded inside the vehicle.

5. The computer-implemented method of claim 4, further comprising utilizing the door-closing model to determine the door-closing event based on at least one of the sound level data, the relative air pressure level data, or the image data.

6. The computer-implemented method of claim 1, wherein utilizing the door-closing model to determine the door-closing event comprises utilizing a machine-learning model trained to predict door-closing events.

7. The computer-implemented method of claim 1, further comprising transmitting, based on the door-closing event, a control signal to a door lock of one or more doors of the plurality of doors to cause the door lock to engage or disengage for controlling access into or out of the vehicle.

8. The computer-implemented method of claim 1, further comprising:
   identifying, via a graphical user interface of a provider computing device, a user interaction with a digital icon to provide an initial signal indicating a transportation pickup or a transportation drop-off, and
   wherein generating the transportation-initiation signal or the transportation-completion signal based on the door-closing event comprises modifying or replacing a digital record based on the initial signal with respect to at least one of a time or location associated with the transportation pickup or the transportation drop-off.

9. The computer-implemented method of claim 1, further comprising:
   identifying, utilizing a global positioning system, a location of the vehicle at a time corresponding to the door-closing event; and
   associating the location of the vehicle with a transportation pickup or a transportation drop-off.

10. The computer-implemented method of claim 1, wherein determining the door-closing event based on the linear acceleration signals comprises:
    processing the linear acceleration signals in a frequency domain; and
    assigning weights to each of three dimensions of the linear acceleration signals, wherein each of the three dimensions of the linear acceleration signals correspond to three-dimensional movement of the mobile device and the assigned weights are based on a relative orientation of the mobile device to the vehicle.

11. A system comprising:
    one or more memory devices; and
    one or more processors configured to cause the system to:
    identify linear acceleration signals as a function of time from one or more sensors corresponding to a mobile device mounted to an interior cabin portion of a vehicle;
    utilize a door-closing model to determine a door-closing event of a door from a plurality of doors associated with the vehicle based on the linear acceleration signals; and generate at least one of a transportation-initiation signal or a transportation-completion signal based on the door-closing event.

12. The system of claim 11, wherein the one or more processors are configured to cause the system to:
identify rotational velocity signals as a function of time from the one or more sensors corresponding to the mobile device; and
utilize the door-closing model to determine the door-closing event further based on the rotational velocity signals.

13. The system of claim 11, wherein the one or more processors are configured to cause the system to:
identify rotational acceleration signals as a function of time from the one or more sensors corresponding to the mobile device; and
utilize the door-closing model to determine the door-closing event further based on the rotational acceleration signals.

14. The system of claim 11, wherein the one or more processors are configured to cause the system to:
identify, from one or more additional sensors associated with the mobile device or a transportation provider computing device separate from the mobile device, at least one of:
sound level data based on sound levels recorded inside the vehicle;
relative air pressure level data based on an ambient air pressure recorded inside the vehicle; or
image data based on images recorded inside the vehicle.

15. The system of claim 14, wherein the one or more processors are configured to cause the system to utilize the door-closing model to determine the door-closing event based on at least one of the sound level data, the relative air pressure level data, or the image data.

16. The system of claim 11, wherein the one or more processors are configured to cause the system to utilize the door-closing model to determine the door-closing event by utilizing a machine-learning model trained to predict door-closing events.

17. The system of claim 11, wherein the one or more processors are configured to cause the system to transmit, based on the door-closing event, a control signal to a door lock of one or more doors of the plurality of doors to cause the door lock to engage or disengage for controlling access into or out of the vehicle.

18. The system of claim 11, wherein the one or more processors are configured to cause the system to:
identify, via a graphical user interface of a provider computing device, a user interaction with a digital icon to provide an initial signal indicating a transportation pickup or a transportation drop-off, and
generate the transportation-initiation signal or the transportation-completion signal based on the door-closing event by modifying or replacing a digital record based on the initial signal with respect to at least one of a time or location associated with the transportation pickup or the transportation drop-off.

19. The system of claim 11, wherein the one or more processors are configured to cause the system to:
identify, utilizing a global positioning system, a location of the vehicle at a time corresponding to the door-closing event; and
associate the location of the vehicle with a transportation pickup or a transportation drop-off.

20. A non-transitory computer-readable storage medium comprising computer-readable instructions that, when executed by at least one processor of a computing device, cause the computing device to:
identify linear acceleration signals as a function of time from one or more sensors corresponding to a mobile device mounted to an interior cabin portion of a vehicle;
utilize a door-closing model to determine a door-closing event
of a door from a plurality of doors associated with the vehicle based on the linear acceleration signals; and
generate at least one of a transportation-initiation signal or a transportation-completion signal based on the door-closing event.

* * * * *